United States Patent [19]
Matsuzaki et al.

[11] Patent Number: 6,140,992
[45] Date of Patent: Oct. 31, 2000

[54] DISPLAY CONTROL SYSTEM WHICH PREVENTS TRANSMISSION OF THE HORIZONTAL SYNCHRONIZING SIGNAL FOR A PREDETERMINED PERIOD WHEN THE DISPLAY STATE HAS CHANGED

[75] Inventors: Eiichi Matsuzaki, Kawasaki; Taketo Hasegawa; Toshiyuki Nobutani, both of Yokohama; Masami Shimakura; Junichi Tanahashi, both of Tokyo; Kenichiro Ono, Soka; Hajime Morimoto, Tokyo; Tatsuya Sakashita, Yokohama, all of Japan

[73] Assignee: Canon Kabushiki Kaisha, Tokyo, Japan

[21] Appl. No.: 08/951,106

[22] Filed: Oct. 15, 1997

Related U.S. Application Data

[63] Continuation of application No. 08/366,928, Dec. 30, 1994, abandoned.

[30] Foreign Application Priority Data

Jan. 11, 1994 [JP] Japan .................................. 6-012256

[51] Int. Cl.[7] ..................................................... G09G 3/36
[52] U.S. Cl. ............................ 345/98; 345/214; 345/100; 345/123
[58] Field of Search ............................. 345/98, 100, 121, 345/123, 99, 87, 214, 213; 349/37, 171

[56] References Cited

U.S. PATENT DOCUMENTS

| | | | |
|---|---|---|---|
| 4,904,064 | 2/1990 | Lagerwall et al. | 349/37 |
| 4,922,241 | 5/1990 | Inoue et al. | 340/784 |
| 4,964,699 | 10/1990 | Inoue | 350/332 |
| 5,233,446 | 8/1993 | Inoue et al. | 359/55 |
| 5,289,173 | 2/1994 | Numao | 345/87 |
| 5,321,811 | 6/1994 | Kato et al. | 345/98 X |
| 5,374,941 | 12/1994 | Yuki et al. | 345/98 X |
| 5,379,051 | 1/1995 | Suga et al. | 345/97 |
| 5,398,042 | 3/1995 | Hughues | 345/94 |
| 5,434,589 | 7/1995 | Nakamura et al. | 345/98 |
| 5,436,636 | 7/1995 | Nonoshita et al. | 345/100 |
| 5,459,477 | 10/1995 | Fukuda et al. | 345/1 |
| 5,473,449 | 12/1995 | Takemura et al. | 349/171 |
| 5,483,634 | 1/1996 | Hasegawa | 395/162 |
| 5,493,648 | 2/1996 | Murray et al. | 395/164 X |
| 5,495,267 | 2/1996 | Fujitaka | 345/123 |
| 5,499,036 | 3/1996 | Hauck | 345/3 |

FOREIGN PATENT DOCUMENTS

| | | |
|---|---|---|
| 0414988 | 3/1991 | European Pat. Off. . |
| 0450640 | 10/1991 | European Pat. Off. . |
| 0558342 | 9/1993 | European Pat. Off. . |
| 63-243919 | 10/1988 | Japan . |
| 63-243922 | 10/1988 | Japan . |
| 63-243993 | 10/1988 | Japan . |

*Primary Examiner*—Steven J. Saras
*Assistant Examiner*—Fritz Alphonse
*Attorney, Agent, or Firm*—Fitzpatrick, Cella, Harper & Scinto

[57] ABSTRACT

A disturbance of an image in the case where a display format is switched during the display operation is prevented without exerting an adverse influence on the operation of a display apparatus side. The apparatus comprises a display apparatus which has a plurality of display formats by a combination of an effective display region in which a display is performed and a non-display region in which no display is performed and has a memory performance of a display state in which either one of the display formats is selected and the display is executed; a display control apparatus for controlling the display format to be displayed by the display apparatus; means for detecting that the selected display format was changed; means for stopping a transmission request of display information by detecting that the display format was changed; means for measuring a period of time during which the transmission request of the display information is stopped; and means for restarting the transmission request of the display information when a predetermined period of time is measured.

16 Claims, 26 Drawing Sheets

DATA FORMAT OF DISPLAY LINE A

DATA FORMAT OF DISPLAY LINE B

CODE INFORMATION (3 BIT)

0 0 0 : INITIALIZE REQUEST
0 1 1 : SELF TEST REQUEST
0 1 0 : POWER SAVE REQUEST
0 1 1 : POWER SAVE CANCELLATION REQUEST
1 0 0 : HSYNC STOP REQUEST
1 0 1 : HSYNC STOP CANCELLATION

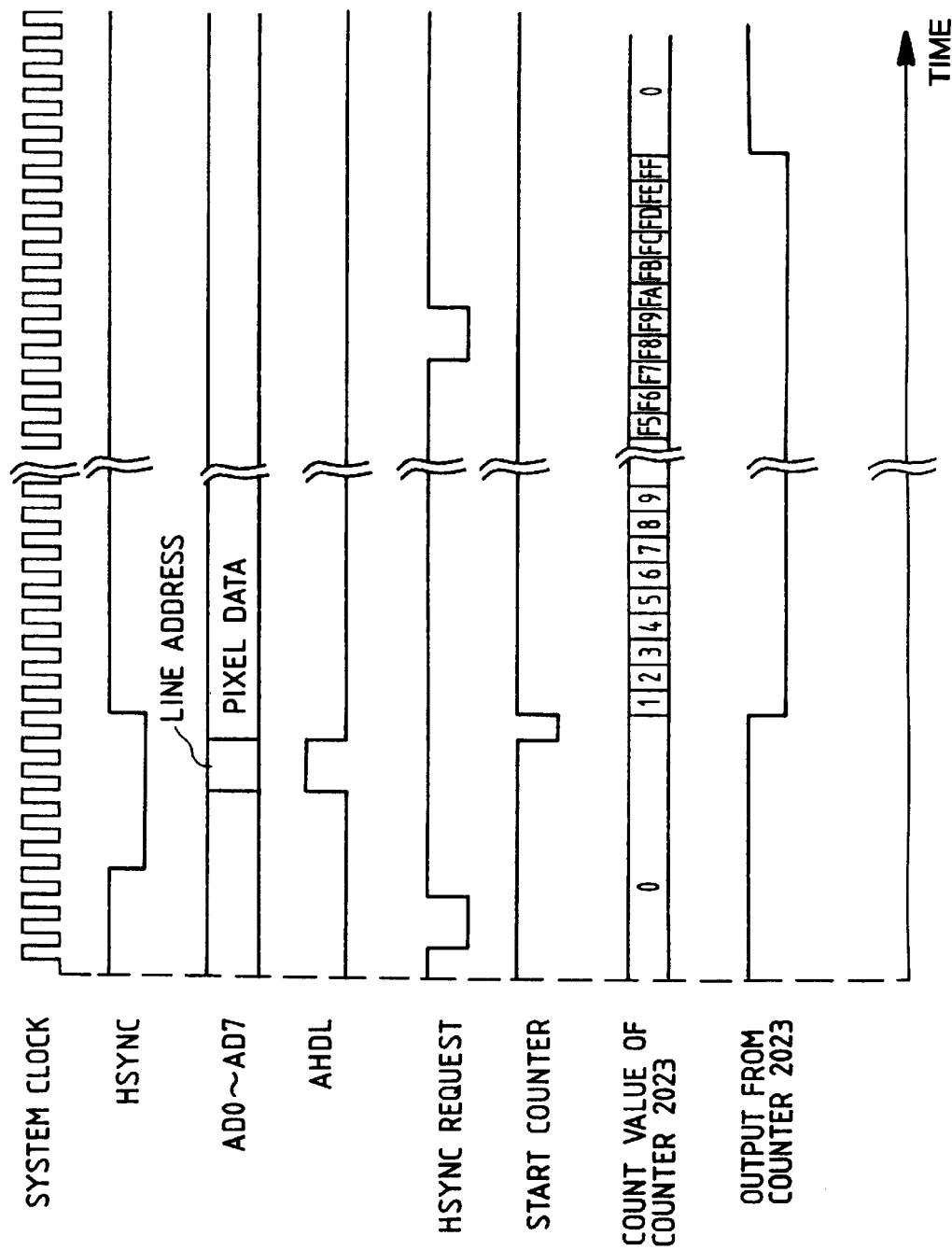

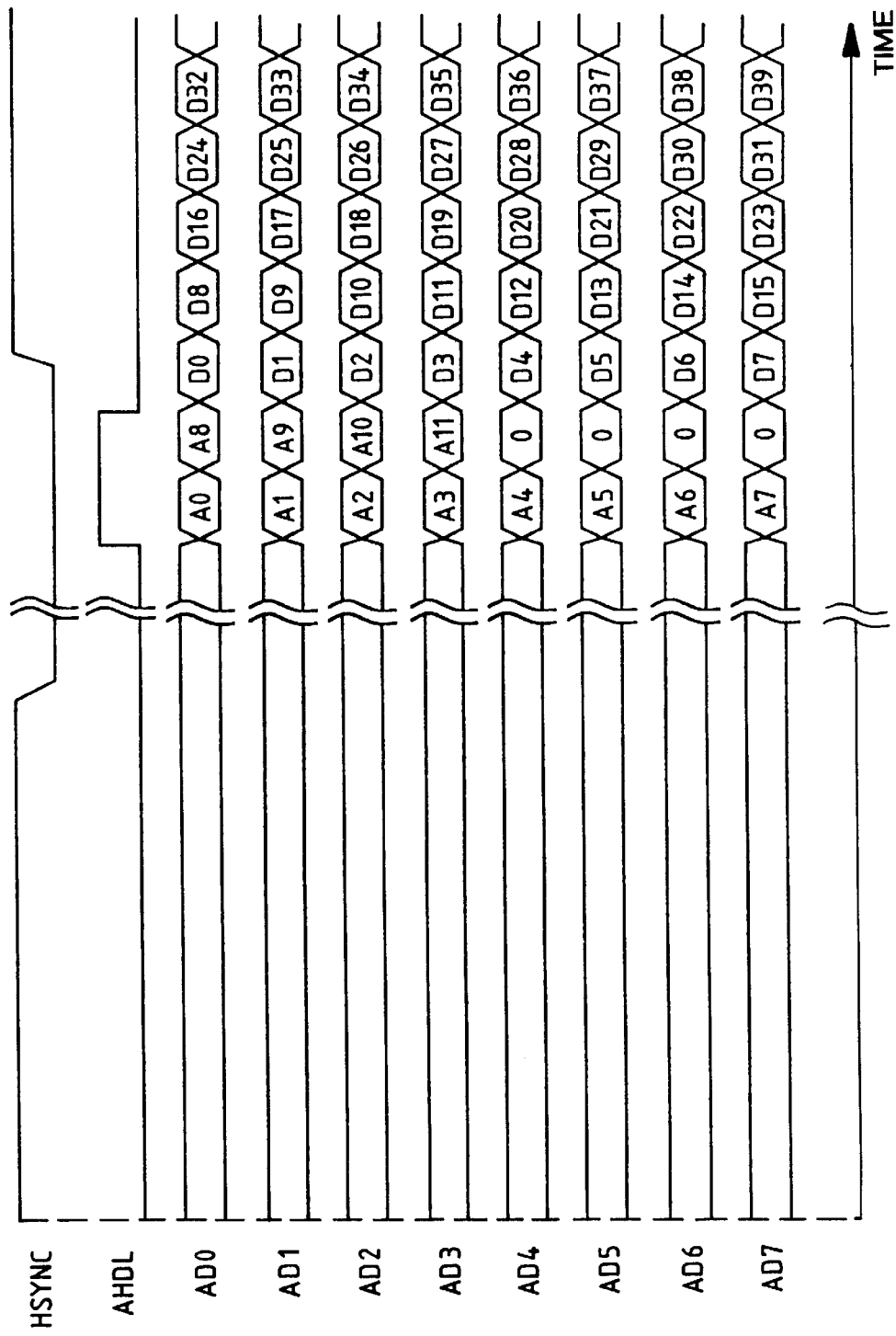

DISPLAY CONTROL SYSTEM WHICH PREVENTS TRANSMISSION OF THE HORIZONTAL SYNCHRONIZING SIGNAL FOR A PREDETERMINED PERIOD WHEN THE DISPLAY STATE HAS CHANGED

This application is a continuation of application Ser. No. 08/366,928 filed Dec. 30, 1994, now abandoned.

BACKGROUND OF THE INVENTION

1. Field of the Invention

The invention relates to a display control system and, more particularly, to a display apparatus having a display device which uses, for example, a ferroelectric liquid crystal as an operation medium for display updating and which can hold the updated display state by applying an electric field or the like. The invention also relates to a display control system comprising a display control apparatus.

2. Related Background Art

Generally, a display apparatus as information display means for performing a visual expressing function of information is used in an information processing system or the like. A CRT display apparatus is well known as such a display apparatus. Since the CRT needs, particularly, a certain extent of length in the thickness direction of a display screen, however, its volume is large and it is difficult to miniaturize the whole display apparatus. A degree of freedom when using the information processing system using such a CRT as a display, namely, a degree of freedom of the installing location, portability, or the like is lost.

A liquid crystal display (hereinafter, simply referred to as an LCD) can be used as a device for compensating such a drawback. Namely, according to the LCD, the whole display apparatus can be miniaturized (particularly, it can be made thin). Among such LCDs, there is a display using liquid crystal cells of the ferroelectric liquid crystal (hereinafter, abbreviated to an FLC) mentioned above (such a display is hereinbelow referred to as an FLCD, namely, FLC display). One of the features of the FLCD is that the liquid crystal cell has a preservation performance of the display state for application of an electric field. Namely, in an FLCD, the liquid crystal cell is thin enough and a molecule of the elongated FLC in the liquid crystal cell is oriented to the first or second stable state in accordance with the applying direction of the electric field and maintains each orientation state even when the electric field is eliminated. The FLCD has a memory performance owing to the bistability of such an FLC molecule. Such FLC and FLCD have been described in detail in, for example, Japanese Laid-open Patent Application No. 63-243922, corresponding to Japanese Patent Application No. 62-76357.

Since the FLCD has the memory performance, in case of driving the FLCD, unlike the CRT or other liquid crystal displays, a surplus time is produced in a period of time for a continuous refresh driving of the display image frame. Separately from such a continuous refresh driving, a partial rewrite driving to update the display state of only the portion corresponding to a change on the display image frame can be performed.

In the FLCD, in accordance with a display information output request signal that is outputted from the display apparatus, by outputting a line address corresponding to the number of lines in the vertical direction of the display image frame and pixel information of the lines, the partial rewrite driving is executed, thereby improving an apparent display speed.

However, in the conventional FLCD control system, since the display apparatus side requires the output of the display information at a certain predetermined period, the following problems occur. For example, in the case where a resolution of an effective display region which is used for display on the image frame of the FLCD has a plurality of display formats such as [1024 pixels (lateral direction)×768 lines (vertical direction)], [800 pixels (lateral direction)×600 lines (vertical direction)], and the like, when the display format is switched during the display operation, the image in the way of the updating operation is displayed until the contents in a video RAM (hereinafter, simply referred to as a VRAM) in which the information to be displayed has been stored are updated to the contents in the display mode after completion of the change. Consequently, a disturbance of the image instantaneously occurs.

As means of solving the problems as mentioned above, there is easily considered means such that until the contents in the VRAM are updated to the contents of the changed display format, the display information is not transmitted on the FLCD interface side even if a transmission request of the information to be displayed by the FLCD arrives.

In case of using such means, however, in spite of the fact that the FLCD side has requested the transmission of the information to be displayed, since no display information is transmitted from the FLCD interface side, the FLCD side is held in the standby state. There occur various troubles such that other processes cannot be executed in the FLCD, the FLCD is not recovered in the standby state in the worst case, and the like.

SUMMARY OF THE INVENTION

The present invention is made on the basis of the drawbacks as mentioned above and it is an object of the invention that a disturbance of an image in the case where a display format is switched during the display operation is prevented without exerting an adverse influence on the operation on the display apparatus side.

To accomplish the above object, according to the invention, in the case where the display format is switched during the display operation, the switching of the display format is detected on the display control apparatus side or display apparatus side and a signal to request a transmission of display information is stopped for a predetermined period of time.

That is, according to the invention, there is provided a display control system in a display apparatus which has a memory performance of a display state and has a plurality of display formats by a combination of an effective display region in which a display is performed and a non-display region in which no display is performed and in which one of those display formats is selected and the display is executed, wherein the display control system comprises: means for transmitting the display format to the display apparatus; means for detecting a change in display format by display format information received through the transmitting means; means for measuring a period of time enough to update the contents in a VRAM to the contents of the changed display format by detecting the change in display format; and means for stopping a transmission request of the display information for a period of time during which the contents in the VRAM are updated to the contents of the changed display format.

According to the above construction, when the effective display region is changed during the display operation, there is no need to display information during the step in which the information in the VRAM in which the display information has been stored is updated to the information corresponding to the changed display format. Therefore, a disturbance of the display image frame can be prevented and a display image frame of a high quality can be obtained.

According to the invention, there is provided a display control system in which a display apparatus which has a memory performance of a display state and has a plurality of display formats by a combination of an effective display region and a non-display region which is allowed to display by the display format designated from a display control apparatus among the plurality of display formats, wherein means of detecting a change in effective display region when the effective display region to display is changed is provided on the display control apparatus side or display apparatus side, so that a signal to request the transmission of the display information can be stopped until the memory contents of the information to be displayed are updated to the information after the change of the effective display region, and further, the memory contents in the step of updating to the information after completion of the change of the effective display region do not need to be displayed without waiting for a process of the display apparatus, so that when the effective display region is changed, a disturbed image is not displayed and a display image of a high quality can be obtained.

BRIEF DESCRIPTION OF THE DRAWINGS

FIG. 27 is a timing chart showing the operation of the FLCD in the fourth embodiment; and FIG. 28 is a timing chart showing a state in which line addresses and pixel data are transmitted to the FLCD in the fifth embodiment.

DETAILED DESCRIPTION OF THE PREFERRED EMBODIMENTS

First Embodiment

Figure 1:
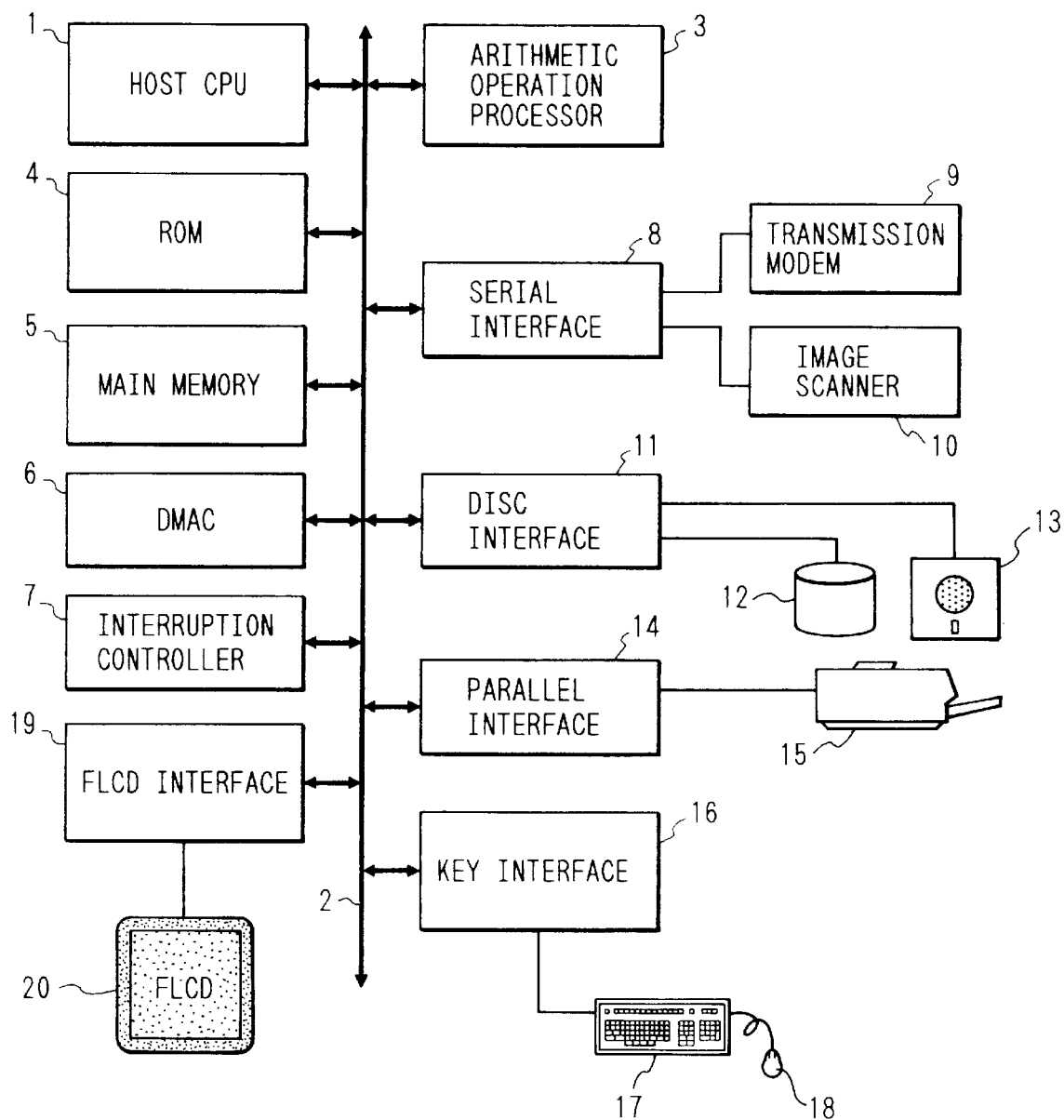
FIG. 1 is a block diagram of a whole information processing apparatus in which a display control system according to an embodiment of the invention is built.

FIG. 1 is a block diagram of a whole information processing system in which an FLC display apparatus having a display control system according to an embodiment of the present invention is used as a display apparatus of various characters, image information, and the like.

In FIG. 1, reference numeral 1 denotes a host CPU to control the whole information processing system; 2 a system bus comprising an address bus, a control bus, and a data bus; 3 an arithmetic operation processor to execute only an arithmetic operating process; 4 an ROM to store a program for performing an initializing process of the whole system and the like; 5 a main memory which is used to store a program or is used as a work area; 6 a DMA controller (Direct Memory Access Controller: hereinafter, abbreviated to a DMAC) to transmit data between the memory and an I/O equipment without intervening the host CPU 1; 7 an interruption controller for performing an interruption control between the CPU and the I/O equipment when an interruption request is generated from the I/O equipment or the like; 9 a transmission modem to transmit by using a public line or an exclusive-use line; 10 an image scanner to read an image or the like; 8 a serial interface for connecting a signal between the transmission modem 9 or image scanner 10 and the system; 12 a hard disc apparatus; 13 a floppy disk apparatus; 11 a disc interface for the hard disc apparatus 12 or floppy disk apparatus 13; 15 a printer represented by, for example, an impact printer or a non-impact printer such as laser beam printer, ink jet printer, or the like; 14 a parallel interface for connecting a signal between the printer 15 and the system; 17 a keyboard for inputting characters, numerals, or the like and for performing other input; 18 a mouse as a pointing device; 16 an interface for a keyboard 17 or the mouse 18; 20 an FLCD (FLC display) which can be constructed by using, for example, a display disclosed in Japanese Patent Application Laid-Open No. 63-243993 by the applicant of the present invention; and 19 an FLCD interface for the FLCD 20.

In the information processing system to which various equipment and the like are connected as described above, generally, the user of the system executes the operation in correspondence to various information displayed on the display screen of the FLCD 20. Namely, characters, image information, and the like which are supplied from the serial interface 8, hard disc 12, floppy disk 13, keyboard 17, and mouse 18, operation information regarding the system operation of the user which has been stored in the ROM 4 or main memory 5, and the like are displayed on the display image frame of the FLCD 20. While observing the display contents, the user executes an editing operation the information or an instructing operation to the system. The above equipment and the like constitute display information supplying means for the FLCD 20.

Figure 2:
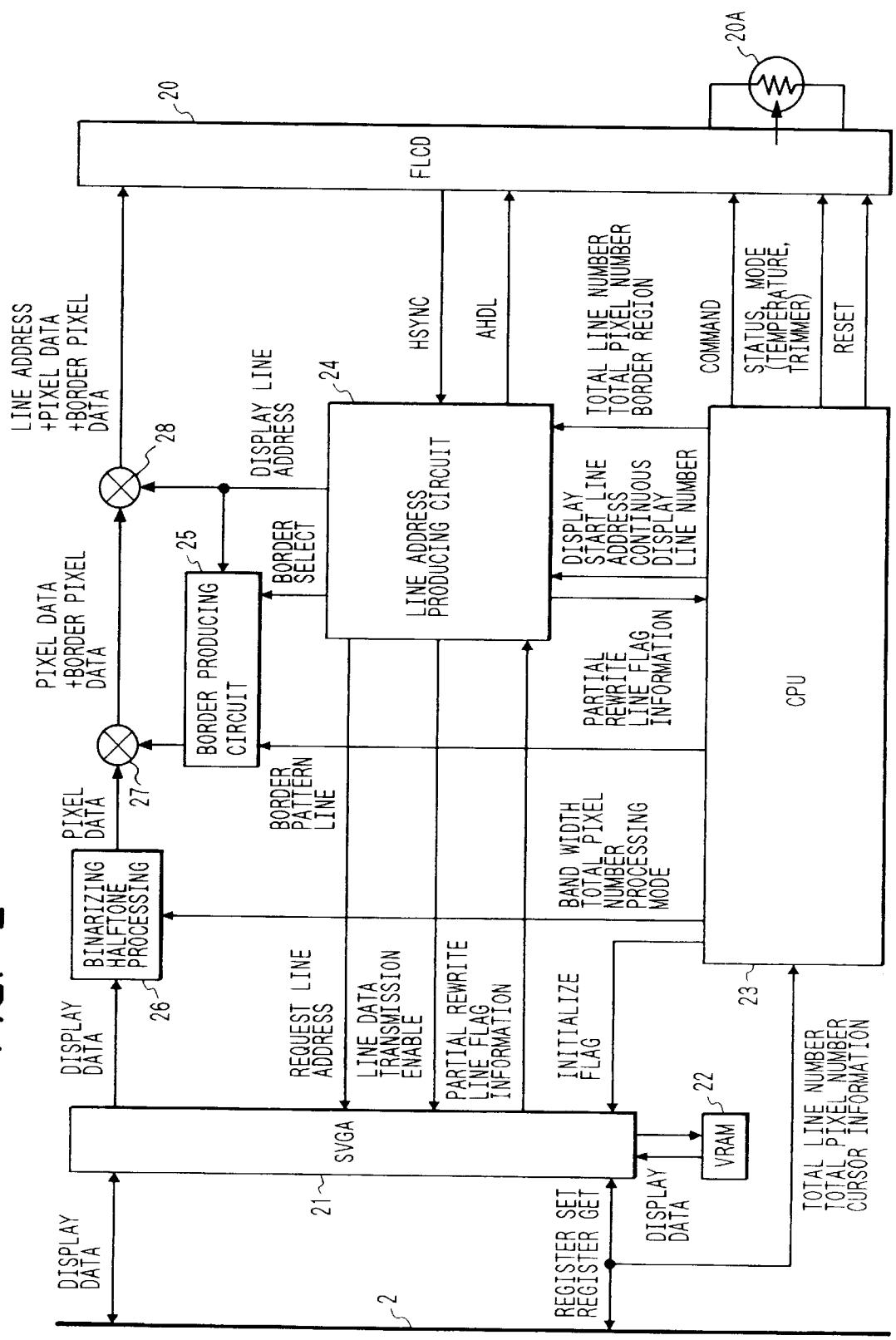
FIG. 2 is a block diagram showing a construction of an FLCD interface as an embodiment of the invention.

FIG. 2 is a block diagram showing a constructional example of the FLCD interface 19 in FIG. 1 as an example of a display control apparatus of the invention.

Figure 3:
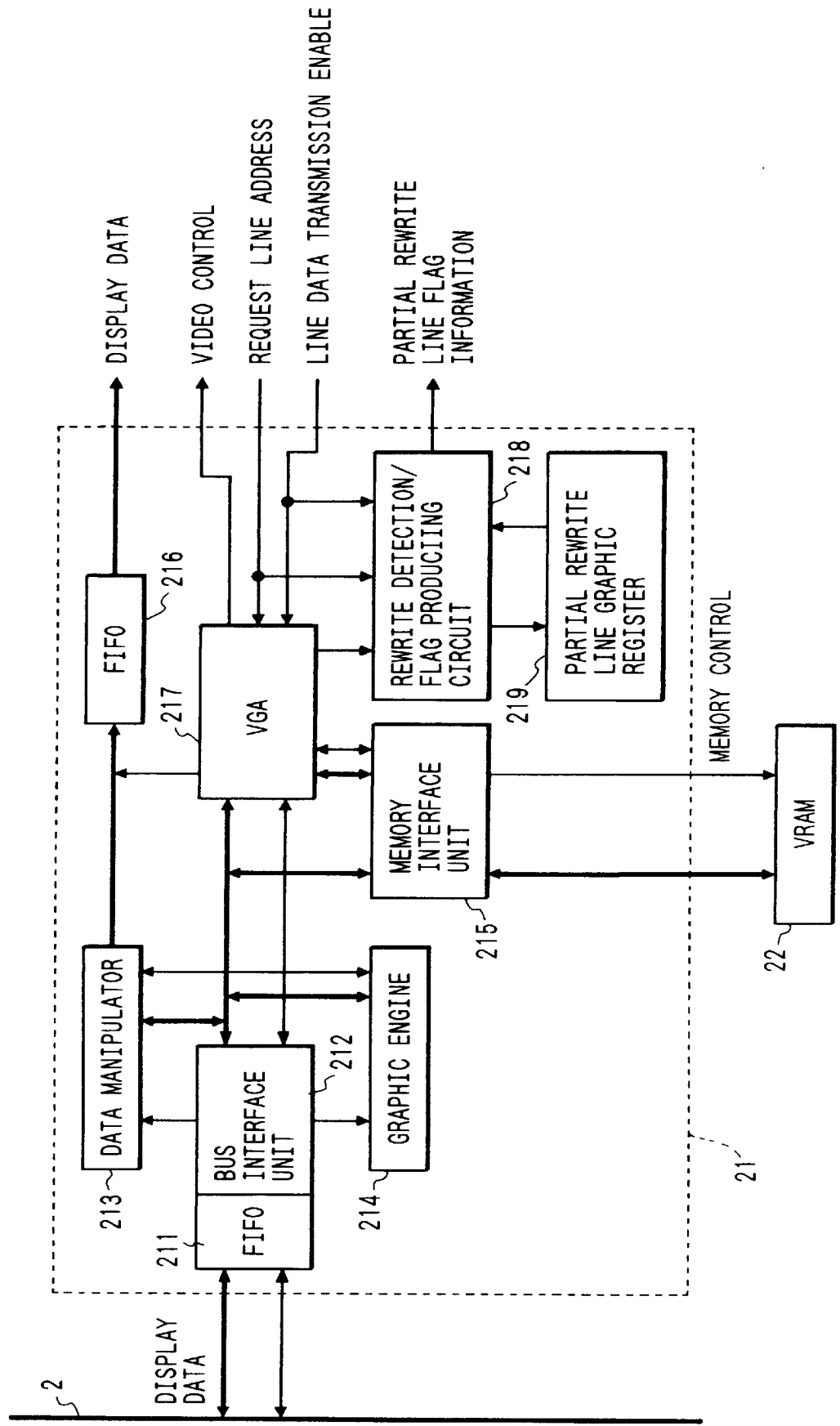
FIG. 3 is a block diagram showing a constructional example of an SVGA.

As shown in FIG. 2, an SVGA 21 using an existing SVGA as a display control circuit for the CRT is used as an FLCD interface 19, namely, display control apparatus of the embodiment. A construction of the SVGA 21 of the embodiment will now be described with reference to FIG. 3. In FIG. 3, rewrite display data which is accessed by the host CPU 1 in FIG. 1 for writing in a display memory window region of the FLCD interface 19 is transmitted through the system bus 2 and is temporarily stored into an FIFO 211. Bank address data for projecting a display memory window region into an arbitrary region in the VRAM 22 is also transferred through the system bus 2. The display data has a form of 24-bit data to express 256 gradations for each of R, G, and B. Control information such as a command from the CPU 1, band address data mentioned above, and the like is transmitted in a format of register set data. Register set data is also transmitted to the CPU 1 side in order for the CPU 1 to know a state on the SVGA side. The register set data and display data stored in the FIFO 211 are sequentially outputted and are set into registers in a bus interface unit 212 and a VGA 217 in accordance with the kinds of those data, respectively. The VGA 217 can know the bank address, its display data, and control command in accordance with the set states of those registers.

On the basis of the addresses and bank addresses in the display memory window region, the VGA 217 produces a VRAM address in a VRAM 22 corresponding to those addresses. Together with the VRAM address, the VGA 217 transmits strobe signals RAS and CAS as memory control signals, a chip select signal CS, and a write enable signal WE to the VRAM 22 through a memory interface unit 215, so that display data can be written into the VRAM address. In this instance, the display data to be rewritten is similarly transferred to the VRAM 22 through the memory interface unit 215.

On the other hand, as will be explained hereinlater in detail, the display data in the VRAM 22 that is specified by a request line address which is transmitted from a line address producing circuit 24 is read out from the VRAM 22 by the VGA 217 in response to a line data transmission enable signal which is similarly transmitted. The read-out display data is stored into an FIFO 216. The display data is sequentially transmitted to the FLCD side from the FIFO 216 in accordance with the order at which the data has been stored.

A data manipulator 213 and a graphic engine 214 serving an accelerator function are provided for the SVGA 21. For example, when the CPU 1 sets data regarding a circle and its center and radius into the registers in the bus interface unit 212 and instructs to draw the circle, the graphic engine 214 produces the circle display data and the data manipulator 213 writes the data into the VRAM 22.

A rewrite detection/flag producing circuit 218 monitors a VRAM address which is generated from the VGA 217 and fetches the VRAM address at the time point when the display data in the VRAM 22 is rewritten (written), namely, when the write enable signal and chip select signal CS are set to "1". A line address is calculated on the basis of the VRAM address, a VRAM address offset which is obtained from the CPU 1, and each data regarding the total number of lines and the total number of line bits. The concept of the calculation is shown in FIG. 4.

Figure 4:
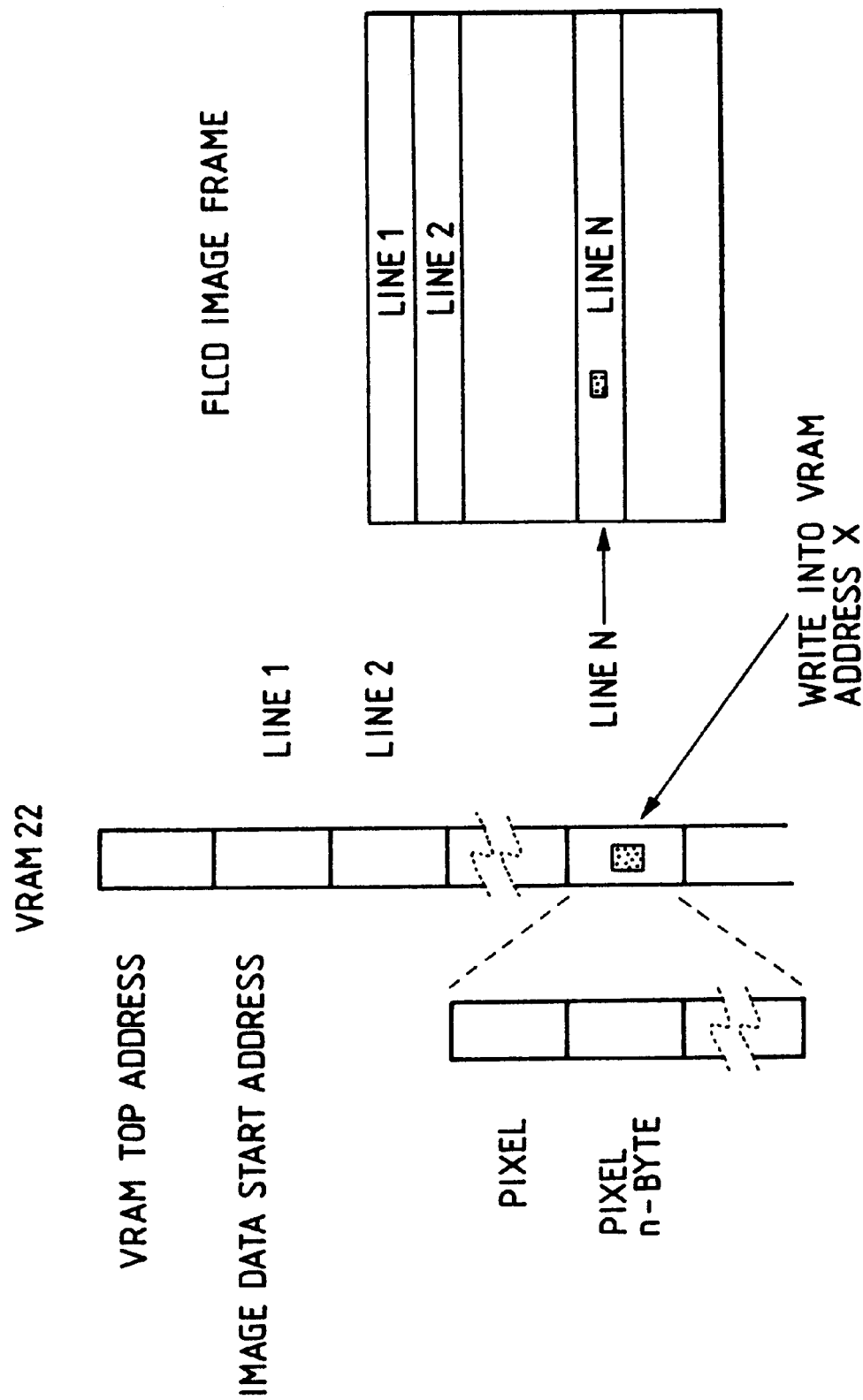
FIG. 4 is a schematic diagram for explaining conversion from VRAM addresses to line addresses according to the invention.

As shown in FIG. 4, it is now assumed that the pixels shown by an address (X) on the VRAM 22 correspond to a line (N) of the FLCD image frame and one line comprises a plurality of pixels and, further, one pixel comprises a plurality of (n) bytes. In this instance, the line address (line number N) is calculated by the following equation.

$$\text{Line number } (N) = \frac{[(VRAM \text{ address } X) - (\text{pixel data start address})]}{[(\text{the number of pixels of one line}) \times (\text{the number of bytes of one pixel})]} + 1$$

Figure 5:
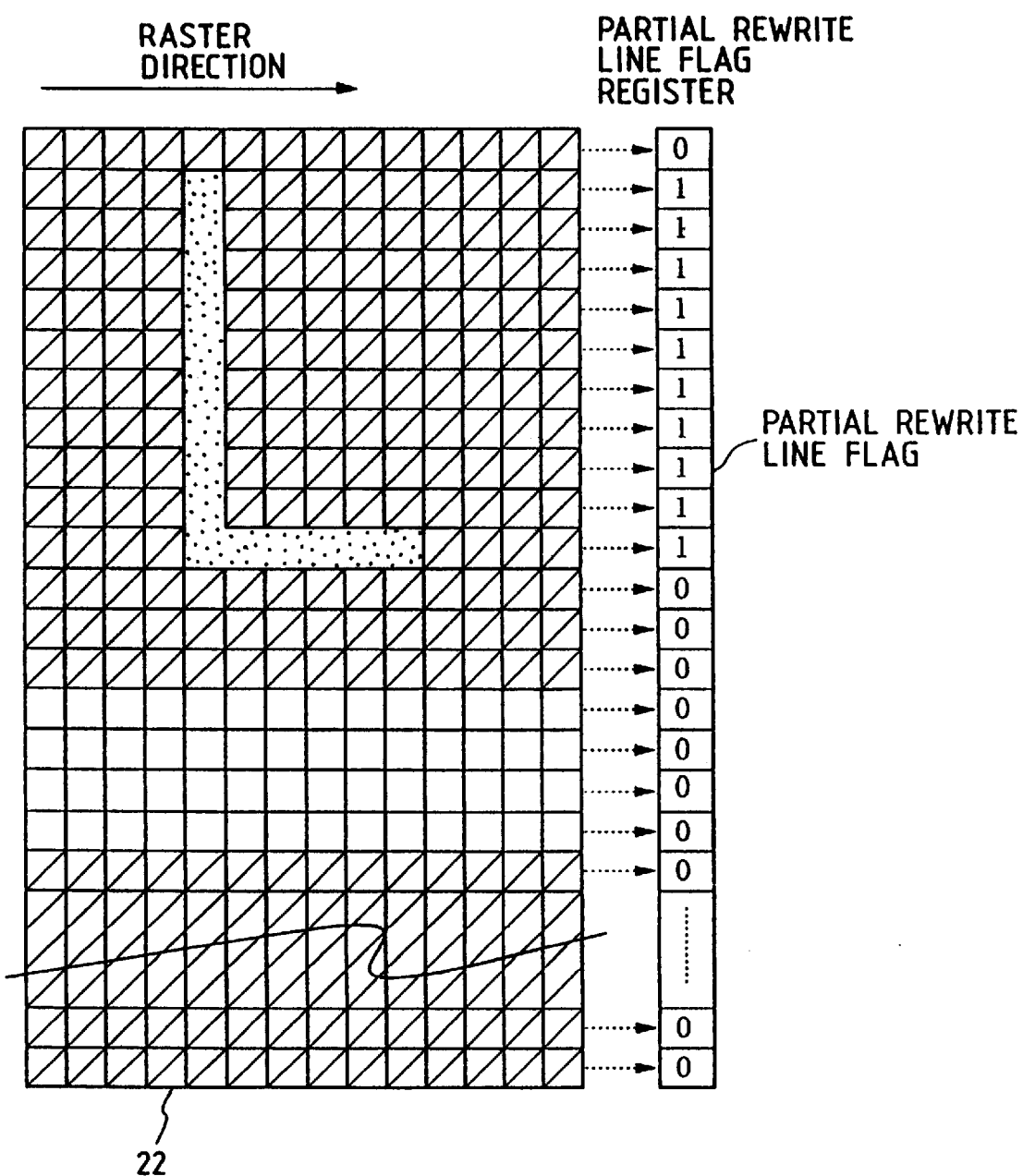
FIG. 5 is a schematic diagram showing the relation between the rewrite display pixels and the rewrite line flag register in the embodiment of the invention.

The rewrite detection/flag producing circuit 218 sets a flag in a partial rewrite line flag register 219 in accordance with the calculated line address. FIG. 5 shows such a state.

As will be obviously understood from FIG. 5, in the case where the display contents in the corresponding address on the VRAM 22 are rewritten in order to display a character of, for example, "L", the line address which was rewritten by the above calculation is detected and a flag is set ("1" is set) into the register corresponding to the line address.

Referring again to FIG. 2, the CPU 23 reads the contents of the rewrite line flag register of the rewrite detection/flag producing circuit 218 through the line address producing circuit 24 and sends the line address in which the flag has been set to the SVGA 21. In this instance, the line address producing circuit 24 transmits a line data transmission enable signal in correspondence to the line address data, thereby allowing the display data in the above address to be transmitted from (FIFO 216 in) the SVGA 21 to a binarizing half tone processing circuit 26.

Figure 6:
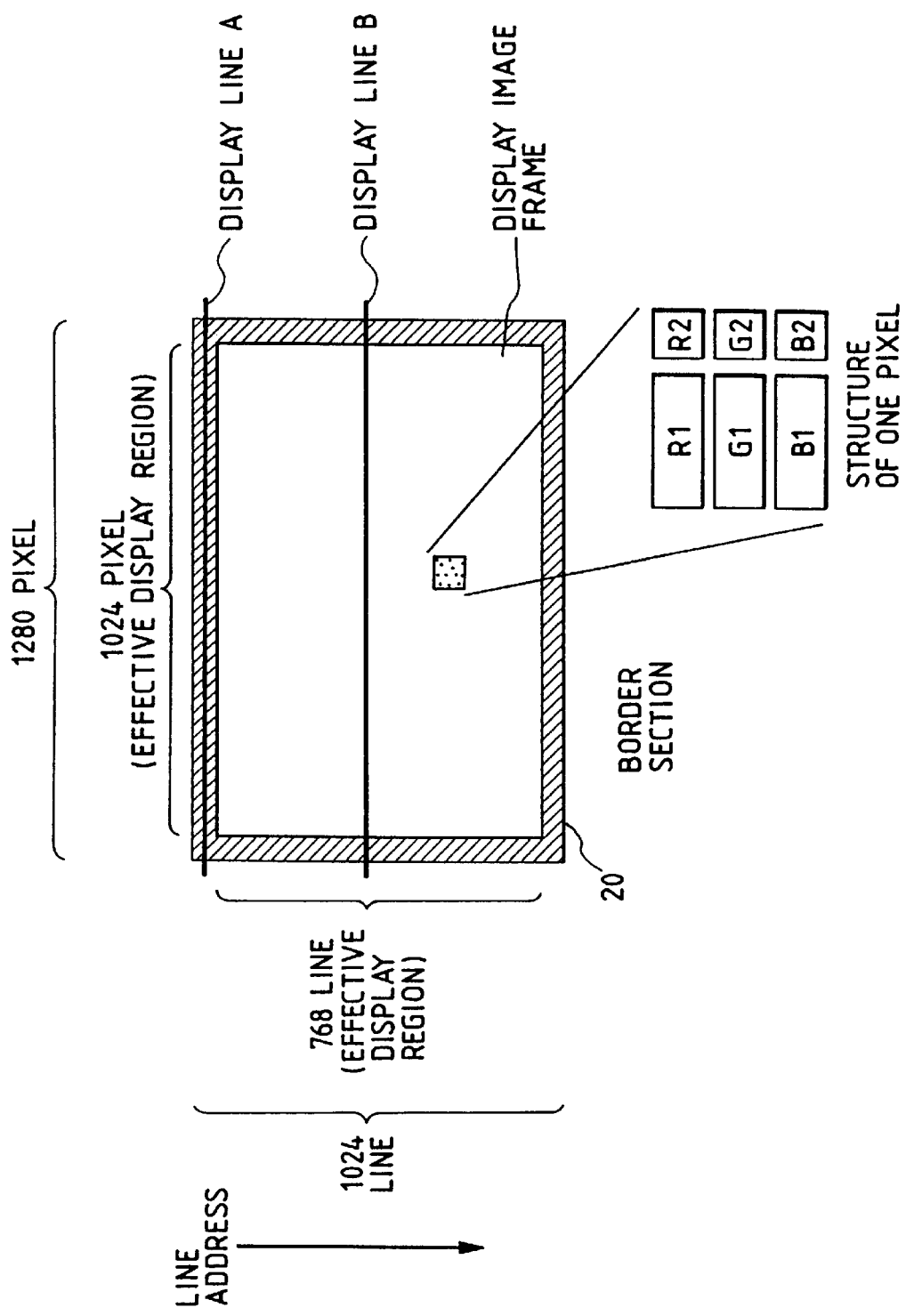
FIG. 6 is a schematic diagram showing an FLCD display image frame according to an embodiment of the invention.
Figure 7A:
FIGS. 7A and 7B are diagrams showing data formats of display data in the embodiment of the invention.

The binarizing half tone processing circuit 26 converts multivalue display data of 256 gradations or 256 colors which are expressed by eight bits with respect to each color of R, G, and B to binary pixel data corresponding to each pixel in the display image frame of the FLCD 20. In the embodiment, one pixel of the display image frame has two display cells of different areas with respect to each color as shown in FIG. 6. In accordance with it, the data of one pixel also has two bits (R1 and R2; G1 and G2; B1 and B2) with respect to each color as shown in FIGS. 7A and 7 B. Therefore, the binarizing half tone processing circuit 26 converts the display data of eight bits for each color to the data of two bits for each color (namely, 4-value data of each color).

Figure 8:
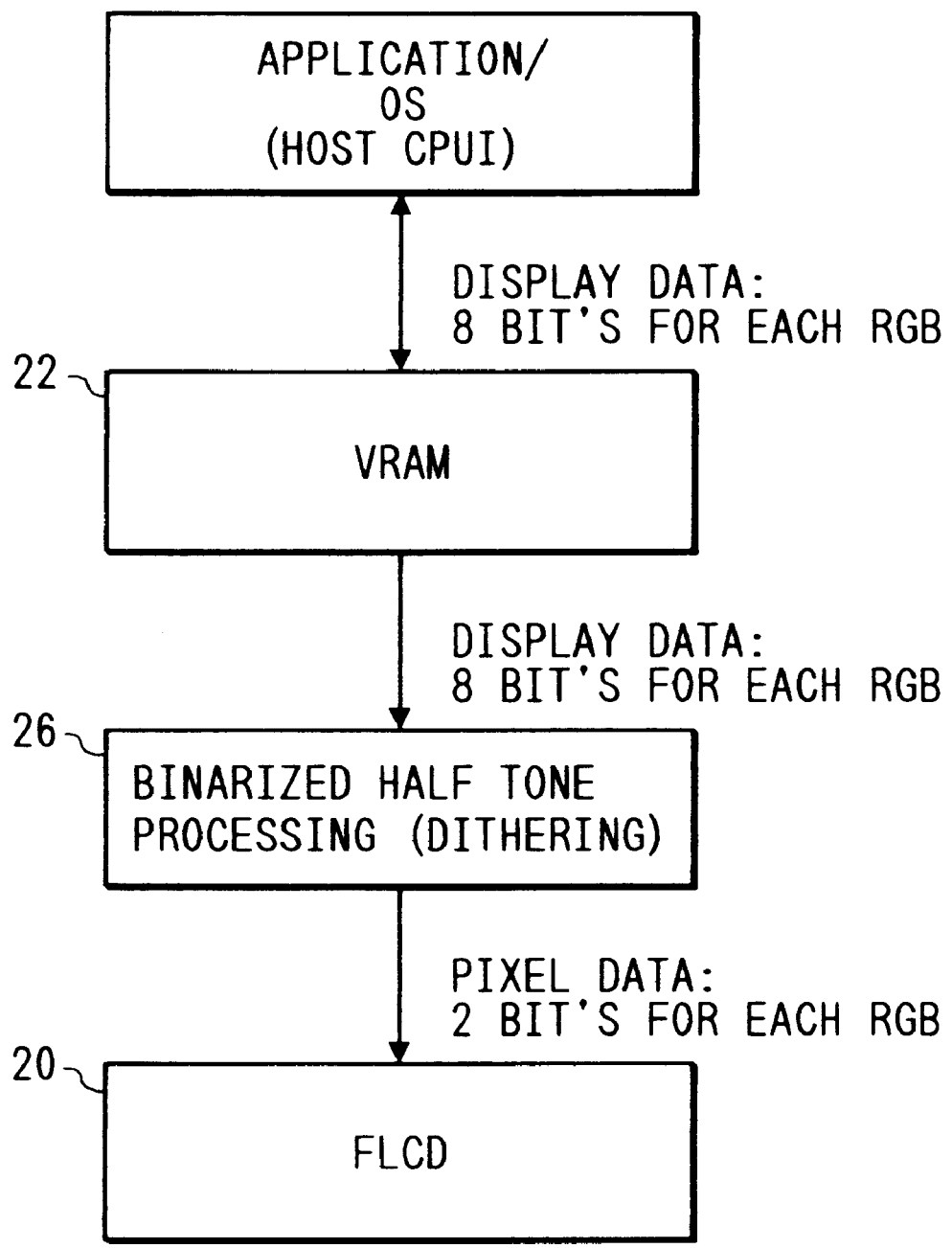
FIG. 8 is a flowchart showing a flow of processes of display data according to the embodiment of the invention.

FIG. 8 shows a flow of data until the display data is converted to the pixel data for FLCD display as mentioned above.

As will be obviously understood from FIG. 8, in the embodiment, the display data in the VRAM 22 is stored as multivalue data of eight bits for each color of R, G, and B and is binarized when it is read out and displayed. The host CPU 1, consequently, can access to the FLCD 20 side in a manner similar to the case of using the CRT. Compatibility with the CRT can thus be assured.

A well-known method can be used as a method which is used in the binarizing half tone process. As such a method, for example, an error diffusing method, a mean density method, a dither method, or the like is known.

In FIG. 2, a border producing circuit 25 produces pixel data of a border section in the FLCD display image frame. Namely, as shown in FIG. 6, the display image frame of the FLCD 20 has 1024 lines each comprising 1280 pixels and is formed so that the border section which is not used in the display image frame forms a frame of the display image frame.

Figure 7B:
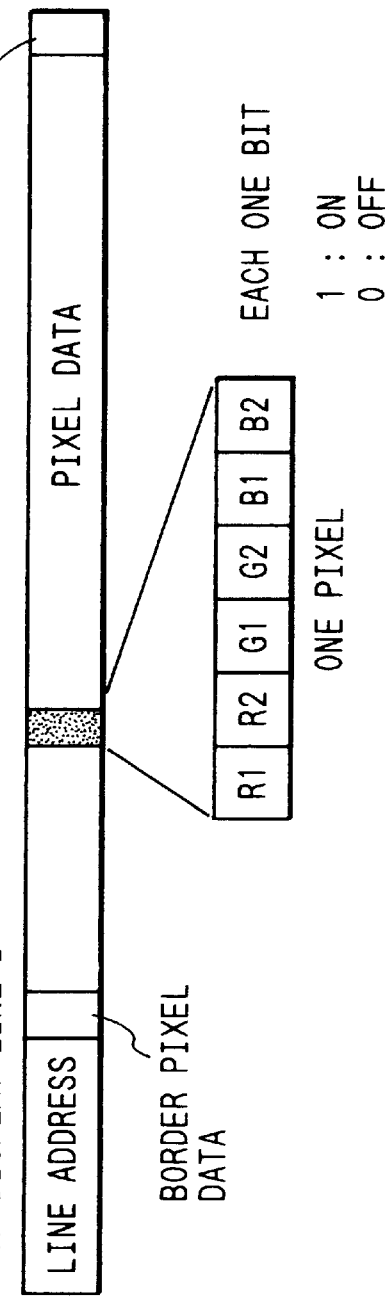

Since the border section exists, a format of the pixel data which is transferred to the FLCD 20 is as shown in FIGS. 7A or 7B. FIG. 7A shows the data format of a display line (A) shown in FIG. 6, namely, a display line such that all of the display lines are included in the border section. FIG. 7B shows the data format of a display line (B) shown in FIG. 6, namely, a line which is used for display. In the data format of the display line (A), a line address is added at the top and border pixel data follows it. On the other hand, in the display line (B), since both edge portions are included in the border section, it has a data format such that after the line address, border pixel data, pixel data, and border pixel data continue in accordance with this order.

The border pixel data produced by the border producing circuit 25 is serially synthesized with the pixel data from the binarizing half tone processing circuit 26 by a synthesizing circuit 27. Further, a display line address from the line address producing circuit 24 is synthesized to the resultant synthetic data by a synthesizing circuit 28. After that, the synthesized data is sent to the FLCD 20.

Figure 9:
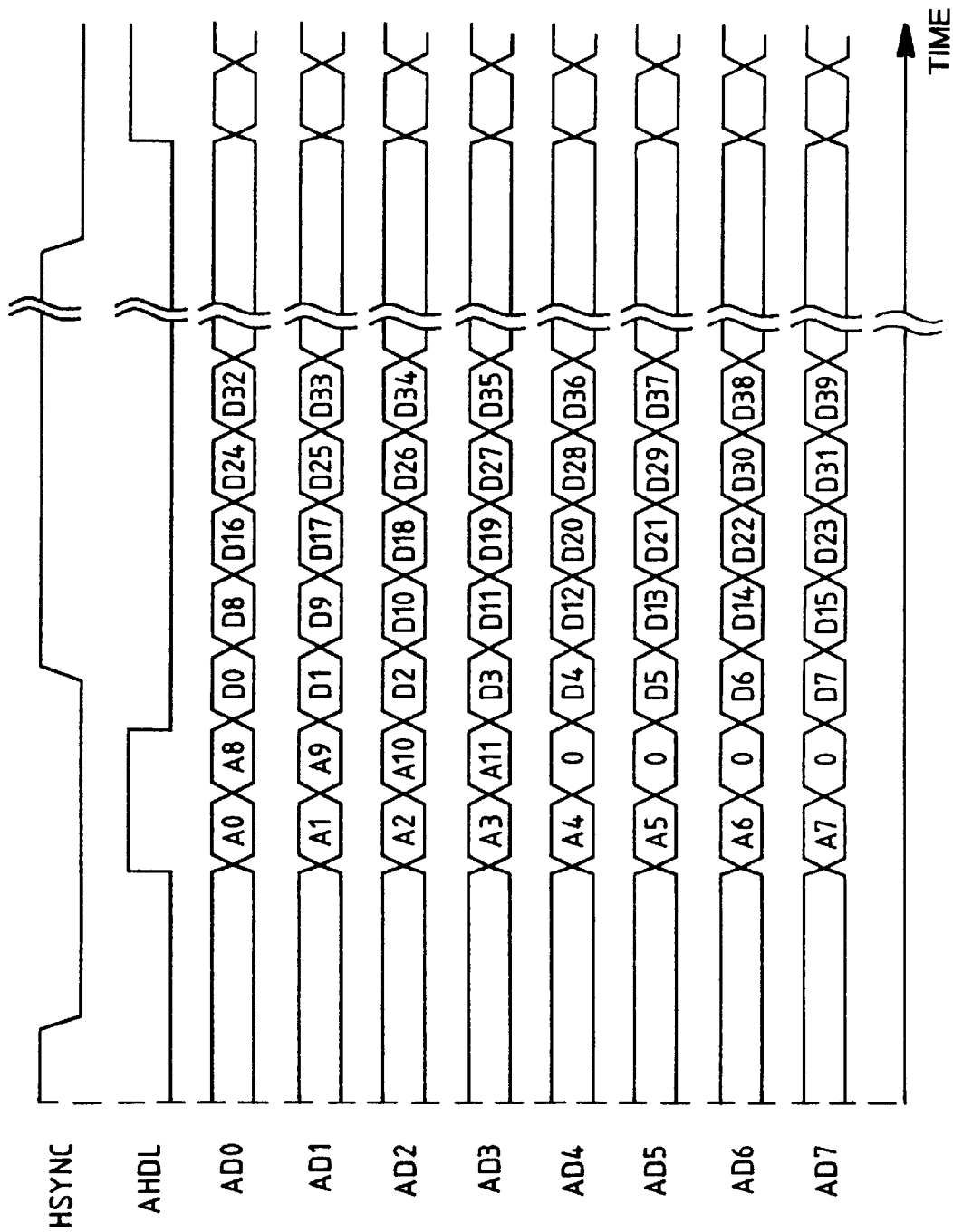
FIG. 9 is a timing chart showing a state in which line addresses and pixel data are transmitted to an FLCD in the embodiment of the invention.

FIG. 9 shows a state in which the display line address and the pixel data are transmitted to the FLCD 20. In the embodiment, it is shown on the assumption that the display line address and the pixel data are transmitted as 8-bit parallel data of AD0 to AD7 to the FLCD 20. First, when a sync signal HSYNC indicative of a transmission request of the data is first supplied from the FLCD 20 to the line address producing circuit 24, the line address producing circuit 24 sends a request line address to the SVGA 21. The display data corresponding to the request line address is outputted from the SVGA 21. At the same time, the line address producing circuit 24 sets an AHDL signal to discriminate the display line address and the pixel data to the high level "1" and outputs to the FLCD 20 and also transmits the display line address to the FLCD 20. At a time point when the transmission line address has completely been transmitted to the FLCD 20, the AHDL signal is set to the low level "0" and is supplied to the FLCD 20. The pixel data transmitted from the SVGA 21 via the binarizing half tone processing circuit 26 and synthesizing circuit 27 is sent to the FLCD 20. When the AHDL signal is at the high level "1", this means that the display line address has been outputted to signal lines AD0 to AD7. When the AHDL signal is at the low level "0", this means that the pixel data is outputted to the signal lines AD0 to AD7.

A CPU 23 controls the whole construction described above. Namely, the CPU 23 receives various information such as total number of lines of the display image frame, total number of pixels, and cursor information from the host CPU 1. The CPU 23 sends each data of the VRAM address offset, the total number of lines, and the total number of pixels to the rewrite detection/flag producing circuit 218. The CPU 23 initializes the partial rewrite line flag register 219 and transmits each data of the display start line address, the number of continuous display lines, the total number of lines, the total number of pixels, and the border region to the line address producing circuit 24, thereby obtaining partial rewrite line flag information from the line address producing circuit 24. Further, the CPU 23 transmits each data of the band width, the total number of pixels, and the processing mode to the binarizing half tone processing circuit 26 and sends border pattern data to the border producing circuit 25.

The CPU 23 has transmitting means with the FLCD 20 and receives temperature information of the FLCD 20, trimmer information, and status information such as a busy signal BUSY or the like from the FLCD 20. The CPU 23 also sends a command signal and a reset signal to the FLCD 20. The transmitting means can execute the transmission in either a serial transmission mode in which the number of signal lines can be reduced or a parallel transmission mode in which a transfer speed is high. Further, information of the effective display region showing a region which is used for display is transmitted from the CPU 23 to the FLCD 20 by using the transmitting means. The FLCD 20 detects that the effective display region was changed on the basis of such information. There is executed a control to stop the output of the HSYNC signal until the contents of the display region in the VRAM 22 are updated to the contents corresponding to the effective display region after completion of the change.

The operation when the effective display region is changed will now be described hereinbelow. The embodiment will now be described on the assumption that the communication is performed by the serial transmission mode between the CPU 23 and the FLCD 20.

Figure 10:
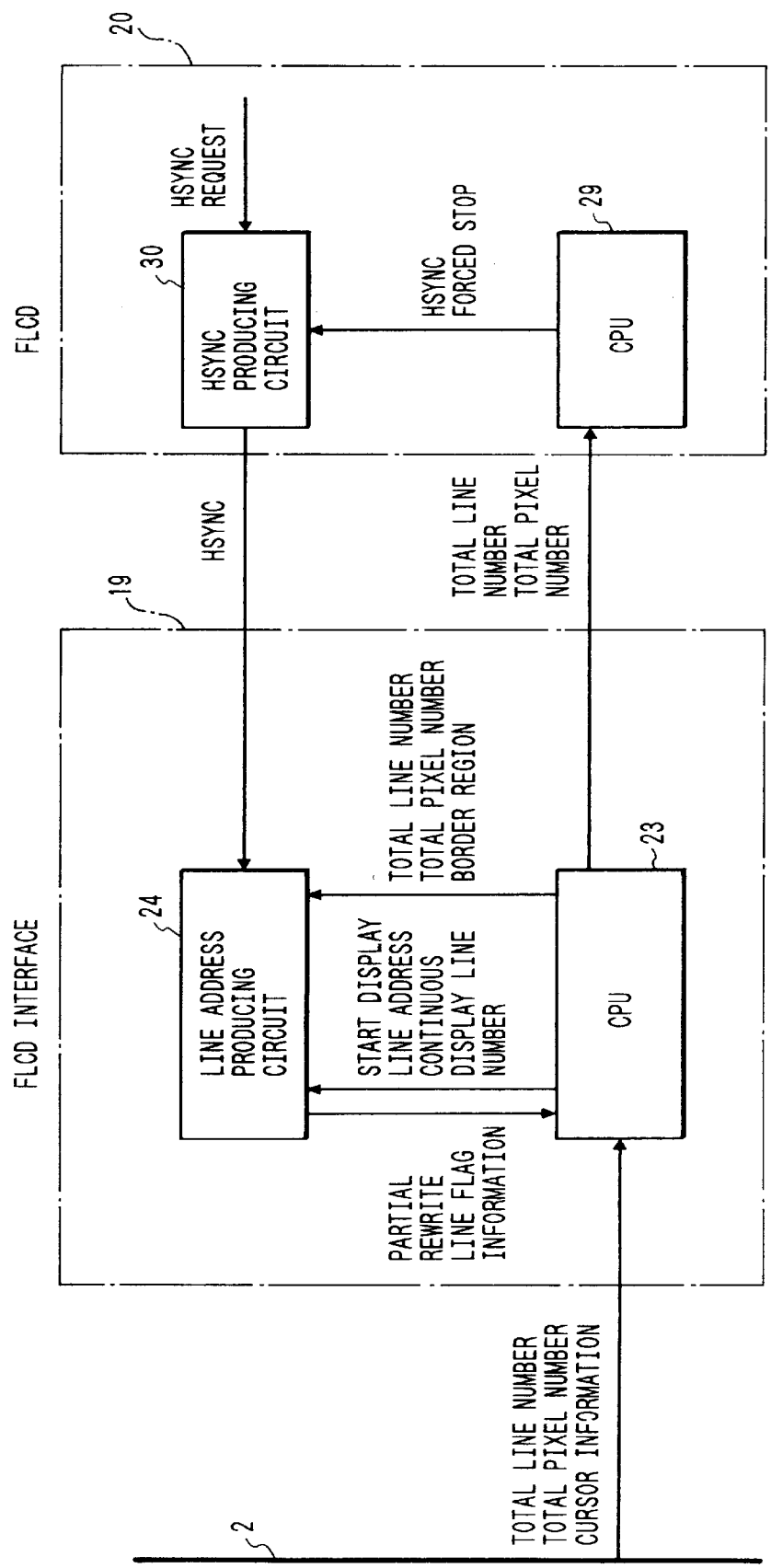
FIG. 10 is a block diagram showing a state in which a transmission is performed by an FLCD interface and the FLCD.

FIG. 10 is a block diagram showing a state in which the CPU 23 and FLCD 20 perform the serial transmission. As an effective display region of the SVGA, in addition to the construction in which the number of pixels per line is equal to 1024 and the number of lines is equal to 768 shown in FIG. 6, constructions of [800 pixels×600 lines], [1280 pixels×1024 lines], etc. are generally known. As an effective display region of the VGA, areas of [640 pixels×480 lines], [640 pixels×400 lines], [320 pixels×200 lines], etc. exist. As mentioned above, a plurality of effective display regions exist in the display function of the VGA, further, in the display function of the SVGA which is obtained by expanding the display function of the VGA. Those effective display regions are often changed in dependence on a difference between the applications to be executed or the like.

When the effective display regions are switched, the CPU 23 in the FLCD interface 19 can judge that the effective display regions were changed from the information indicative of the total number of lines or the total number of pixels of the display image frame which is transmitted from the host CPU 1 through the system bus 2. The FLCD 20 includes a CPU 29 having a function to execute the serial transmission with the CPU 23 in the FLCD interface 19. The CPU 29 sends the temperature information, trimmer information, and status information such as a busy signal BUSY or the like to the FLCD interface 19. The CPU 29 also supplies the command signal and reset signal to the FLCD 20. The CPU 23 in the FLCD interface 19 and the CPU 29 in the FLCD 20 are not limited to the same kind but may be different. The information of the total number of lines and the total number of pixels of the display image frame transmitted to the CPU 23 in the FLCD interface 19 is converted to the serial data.

Figure 11:
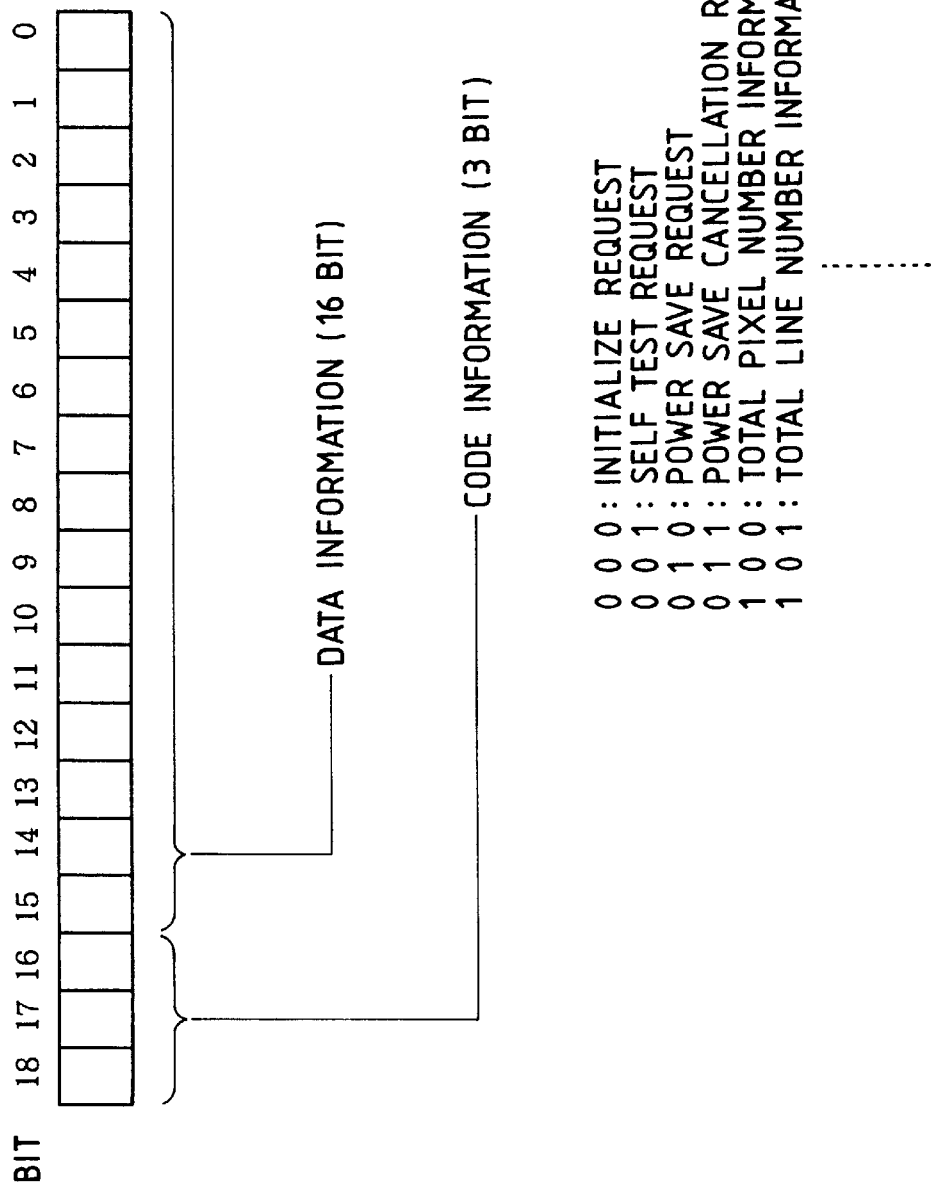
FIG. 11 is a diagram showing a data format of data which is transmitted between the FLCD interface and the FLCD.
Figure 12:
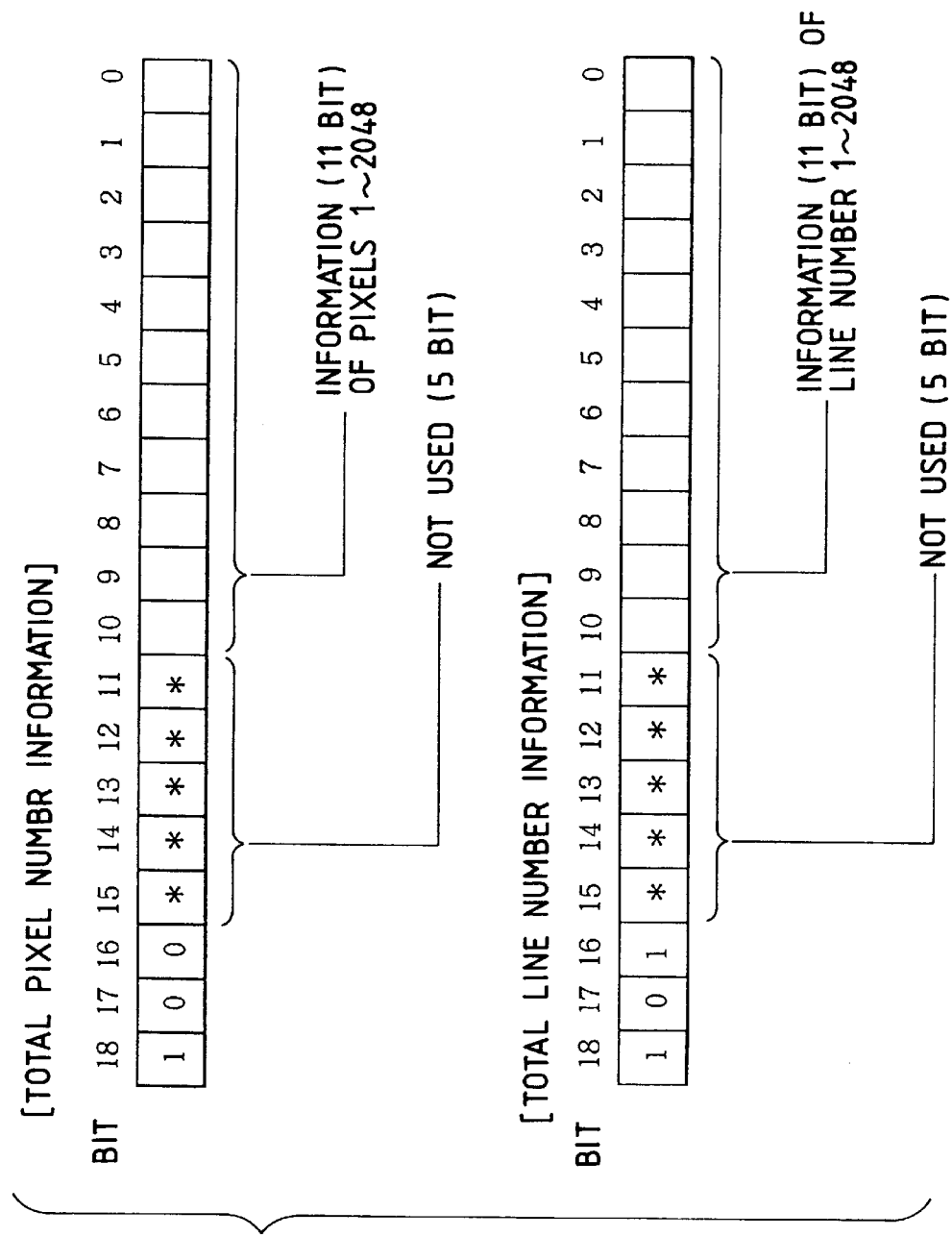
FIG. 12 is a diagram showing a data format of the total pixel number information and total line number information in the embodiment of the invention.

The serial data is supplied as it is to the CPU 29 in the FLCD 20. FIG. 11 shows an example of a format of data which is transmitted from the CPU 23 in the FLCD interface 19 to the CPU 29 in the FLCD 20. It is now assumed that the number of bits of the data is set to 19 bits, upper three bits correspond to the code information indicative of the kind of information, and the remaining 16 bits correspond to the data information indicative of the data associated with the code information. As information to be transmitted, in addition to the total pixel number information and the total line number information, there are an initialize request to request the initialization of the FLCD, a self test request to request a check of each function of the FLCD, and the like. Code information of three bits is allocated to each of those requests. In the embodiment, the total pixel number information is set to "100" and the total line number information is set to "101". FIG. 12 shows a construction of the data in case of the total pixel number information and total line number information. In case of the total pixel number information, "100" is set into the code information of upper three bits. Upper five bits in the data information of 16 bits are not used and the remaining lower 11 bits indicate the pixel number information of 1 to 2048. In case of the total line number information, the lower 11 bits also similarly indicate the line number information of 1 to 2048.

Figure 13:
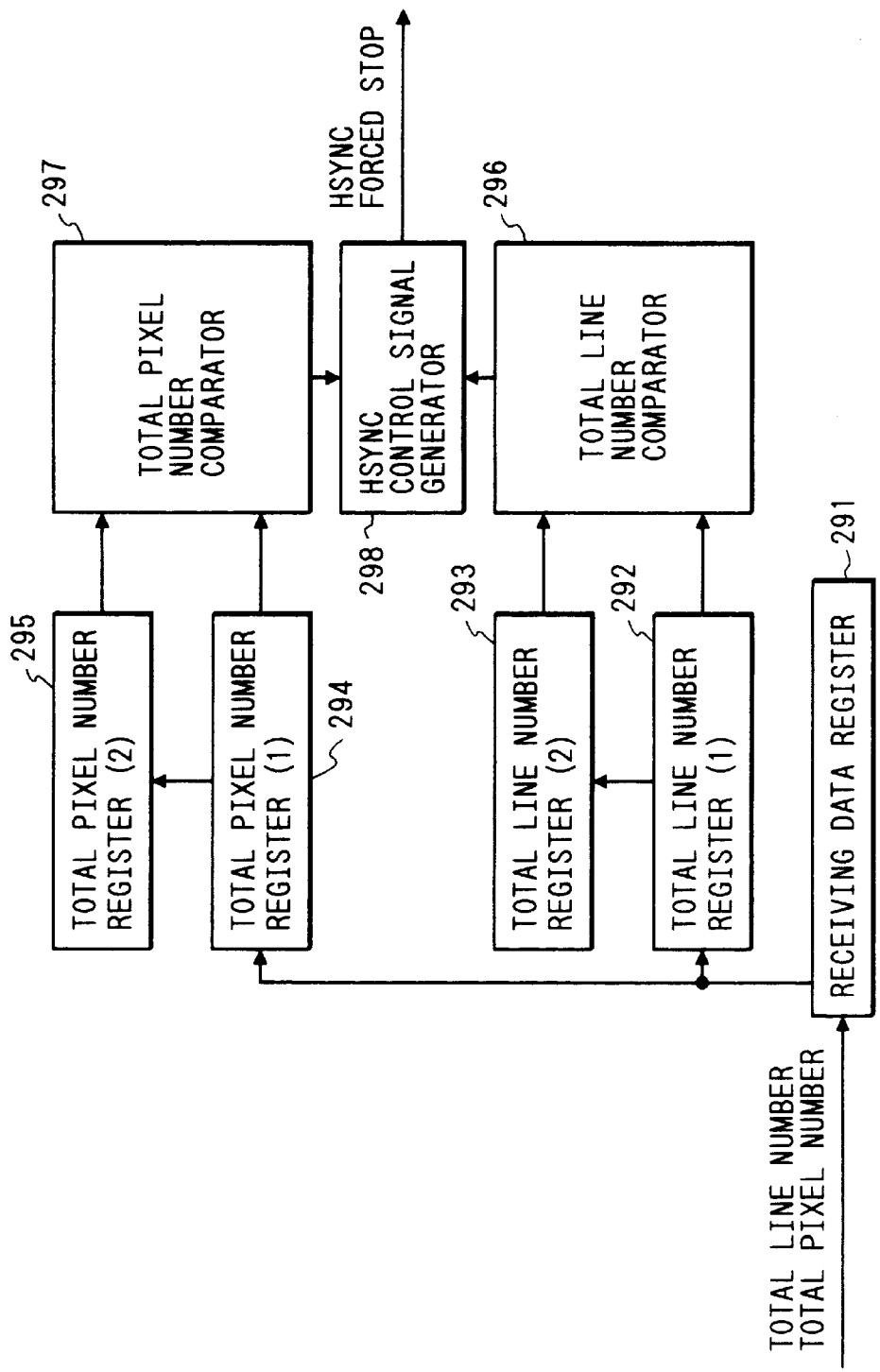
FIG. 13 is a block diagram showing a state in which the total pixel number information and total line number information are processed by a CPU in the FLCD.
Figure 14:
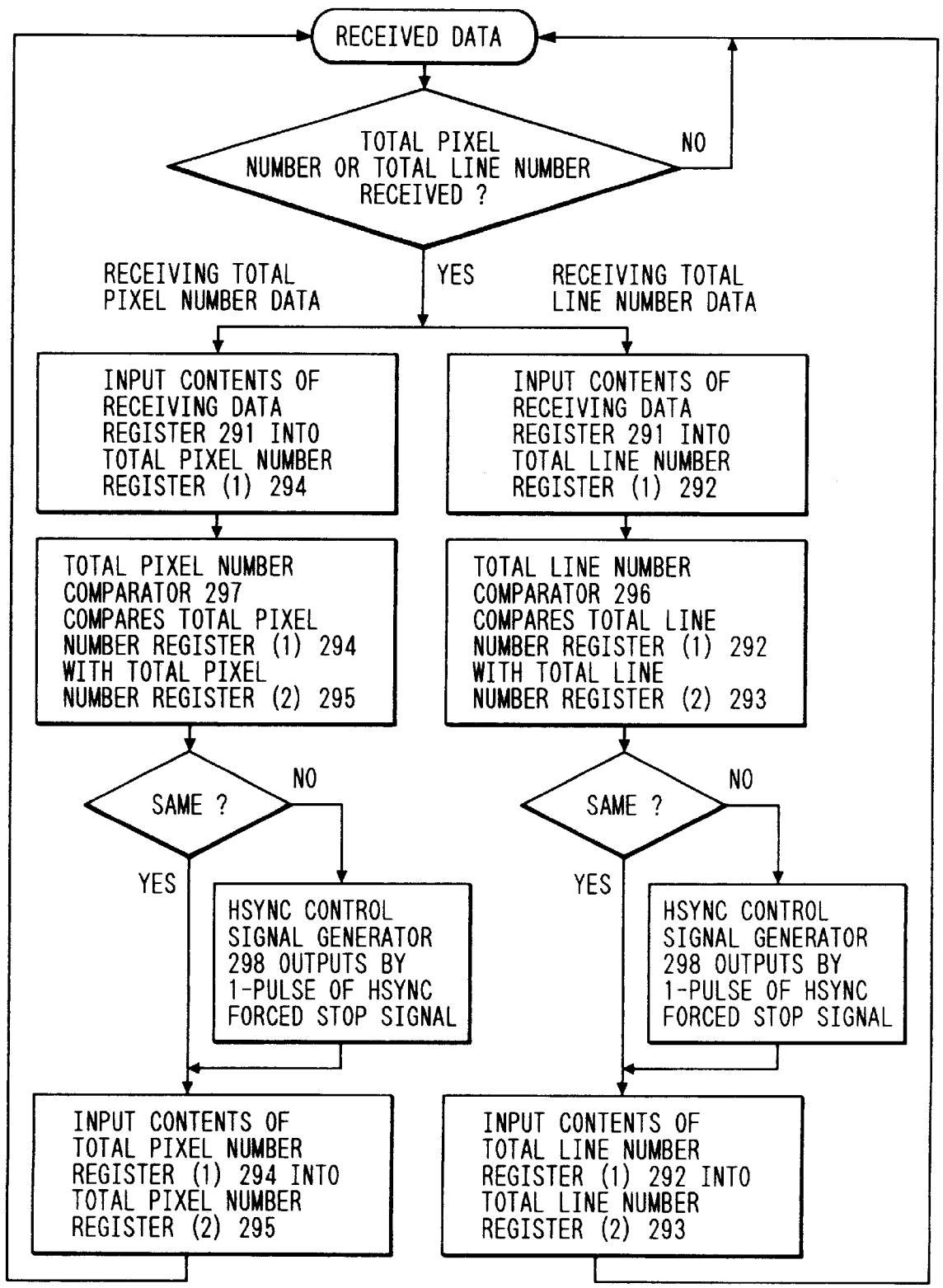
FIG. 14 is a flowchart showing a flow of processes in the CPU in the FLCD shown in FIG. 13.

FIG. 13 shows an example of a block diagram in the CPU 29 for receiving effective display region information which is sent from the CPU 23 in the FLCD interface 19. In the CPU 29, the information of the total number of lines and the total number of pixels of the display image frame which was transmitted is compared with the information of the total number of lines and the total number of pixels which was displayed so far. When different values are transmitted, the CPU 29 generates an HSYNC forced stop signal to an HSYNC producing circuit 30 in order to stop the generation of the HSYNC signal. FIG. 14 shows a flow for such a process. First, when the effective display region is changed and data is set into a receiving data register 291, a check is made from the code information of upper three bits to see if the received data indicates the total pixel number information or the total line number information. When the received data indicates the total pixel number information, the contents of the receiving data register 291 are inputted into a total pixel number register (1) 294. Subsequently, the value of the total pixel number register (1) 294 is compared with the value of a total pixel number register (2) 295 in which the number of pixels of the effective display region of the image frame displayed so far by a total pixel number comparator 297. When they differ, the HSYNC forced stop signal to stop the output of the HSYNC signal is generated by only one pulse from an HSYNC control signal generator 298. After that, the contents of the total pixel number register (1) 294 are inputted to the total pixel number register (2) 295. When the value of the total pixel number register (1) 294 coincides with the value of the total pixel number register (2) 295, the contents of the total pixel number register (1) 294 are inputted to the total pixel number register (2) 295 without outputting the HSYNC forced stop signal. When the received data indicates the total line number information as well, processes are executed in a manner similar to that mentioned above. When the values of total line number registers (1) 292 and (2) 293 are different, the HSYNC forced stop signal is generated by only one pulse from the HSYNC control signal generator 298.

Figure 15:
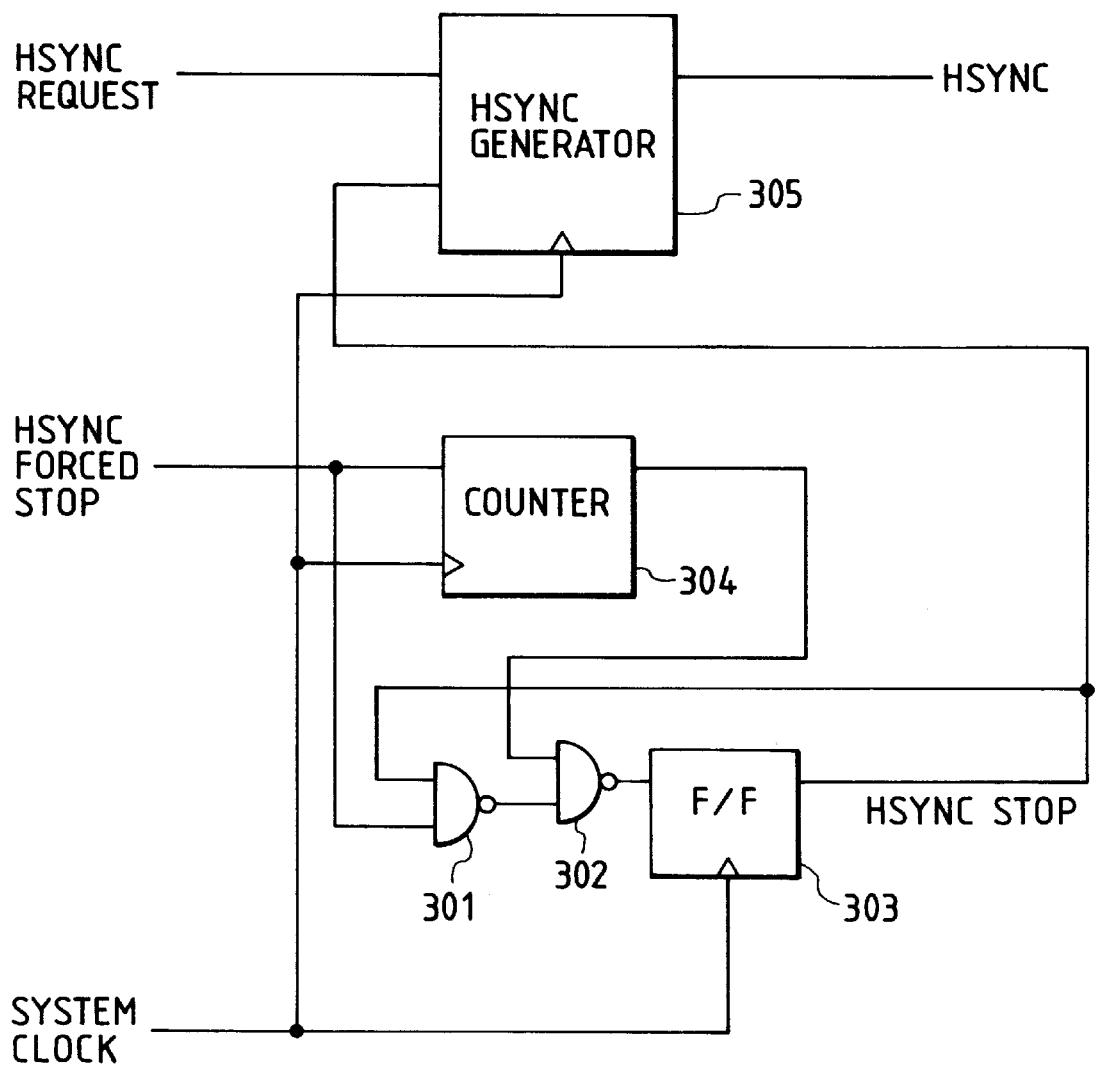
FIG. 15 is a block diagram showing an example of an HSYNC producing circuit.
Figure 16:
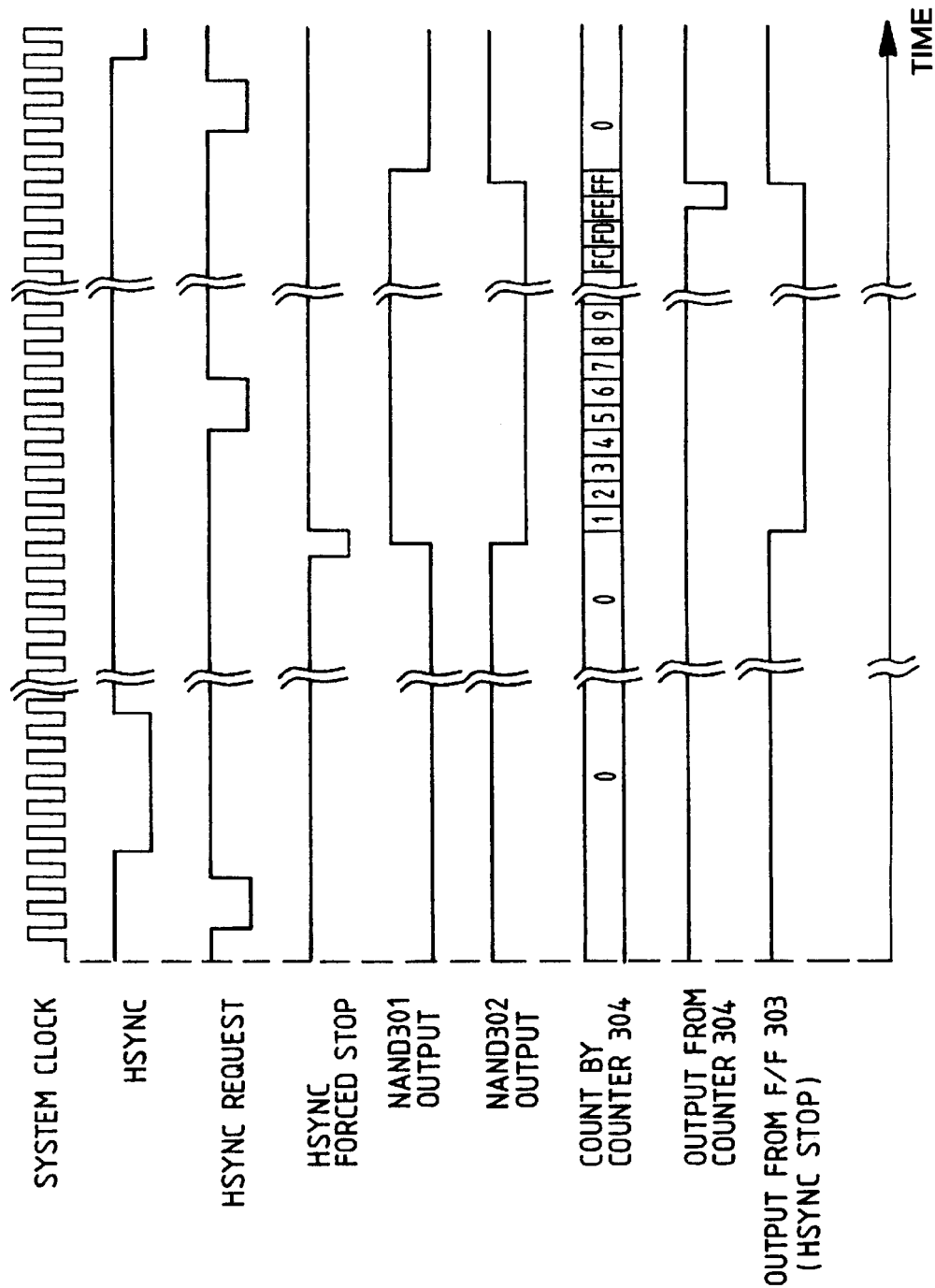
FIG. 16 is a timing chart showing the operation of the HSYNC producing circuit.

The HSYNC forced stop signal is inputted to the HSYNC producing circuit 30 in FIG. 10 and functions as a start signal to stop the HSYNC signal for a predetermined period of time. FIG. 15 shows a block diagram of the HSYNC producing circuit 30. FIG. 16 shows its timing chart. In the embodiment, each of the input and output signals (HSYNC, HSYNC request, HSYNC forced stop) is handled as a signal of a negative logic. A system clock is a reference clock signal to synchronize the whole system. For a period of time during which the effective display region on the image frame is not changed, when a display preparation of the display data received is completed in the FLCD 20, in order to request the next display data, the HSYNC request signal is inputted to an HSYNC generator 305. The HSYNC signal is outputted at the low level from the HSYNC generator 305. In FIG. 15, the CPU 29 in the FLCD 20 shown in FIG. 10 detects a change in effective display region from the information of the total number of lines and the total number of pixels which is sent from the host CPU 1 in FIG. 1. When the HSYNC forced stop signal is outputted to the HSYNC producing circuit 30, a signal at the low level is inputted to one input line of an NAND gate 301 in the HSYNC producing circuit 30. Thus, the signal at the high level is addressed to one input line of an NAND gate 302. When the high level signal is inputted from the NAND gate 301, the NAND gate 302 generates a low level signal to a flip-flop 303. In the flip-flop 303, an output signal is set to the low level when the low level signal is inputted at a leading time of a system clock signal. The output signal of the flip-flop 303 is inputted to the HSYNC generator 305 as an HSYNC stop signal as a signal to stop the output of the HSYNC signal. The output signal of the flip-flop 303 is further inputted to another input line of the NAND gate 301, thereby keeping an output signal of the flip-flop 303 until a low level signal is outputted from an output line of a counter 304. The HSYNC forced stop signal becomes a start signal of the counter 304. When the low level signal is inputted, the counter 304 executes a count-up operation synchronously with a leading edge of the system clock signal. An up-counter of eight bits is used here. When the count value is equal to "FF" as a hexadecimal number, the counter generates a low level signal. After that, the count value is returned to "0" and the count-up operation is stopped.

The number of bits of the counter needs to be set to a value such as to obtain a time enough to rewrite the contents in the VRAM 22 to the contents corresponding to the changed effective display region when the effective display region is changed. The number of bits of the counter can be set to an arbitrary value so long as it is larger than such a value as mentioned above. As a value to be counted, a predetermined value can be set in the counter 304. Or such a value can be also arbitrarily set by external means such as a CPU 29.

For a period of time during which the HSYNC stop signal at the low level is inputted to the HSYNC generator 305, even if the HSYNC request signal is inputted to the HSYNC generator 305, no HSYNC signal is generated.

When the counter 304 executes the counting operation up to "FF" and generates the low level signal, the signal is inputted to another input line of the NAND gate 302. Thus, the input signal of the flip-flop 303 is set to the high level. When it is detected that the low level signal has been inputted at a leading time point of the system clock signal, the flip-flop 303 sets the output signal to the high level, thereby cancelling the stop of the output of the HSYNC signal. After the stop of the output of the HSYNC signal was cancelled, each time the HSYNC request signal is inputted to the HSYNC generator 305, the HSYNC signal is outputted.

As described above, when the effective region of the displayed image frame is changed, the change in effective display region of the FLCD 20 is detected from the total pixel number information and total line number information sent from the FLCD interface 19. The output of the HSYNC signal can be stopped for a period of time during which the contents in the VRAM 22 are updated to the contents corresponding to the changed effective display region.

Other Embodiments

Second Embodiment

The first embodiment has been described with respect to the system such that the CPU 29 in the FLCD 20 judges the change in effective display region from the total pixel number information and total line number information sent from the FLCD interface 19 and produces the signal to stop the HSYNC signal. The second embodiment will now be described with respect to a case where the CPU 23 in the FLCD interface 19 judges the change in effective display region is judged from the total pixel number information and total line number information sent from the host CPU 1 and transmits a command to request the stop of the output of the HSYNC signal to the CPU 29 in the FLCD 20.

Figure 17:
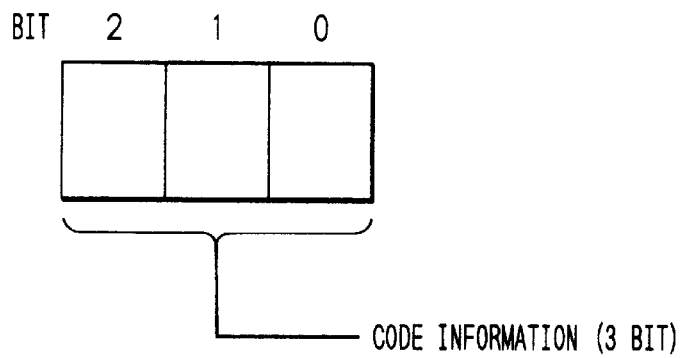
FIG. 17 is a diagram showing a data format of data which is transmitted between the FLCD interface and the FLCD in the second embodiment.

In the above system, in order to detect that the effective display region has been changed by the CPU 23 in the FLCD interface 19, there is no need to transmit the total number of pixels and the total number of lines as information to be transmitted to the CPU 29 in the FLCD 20. It is sufficient to transmit only the code information as shown in FIG. 17. The number of bits of the code information is set to three bits here.

Figure 18:
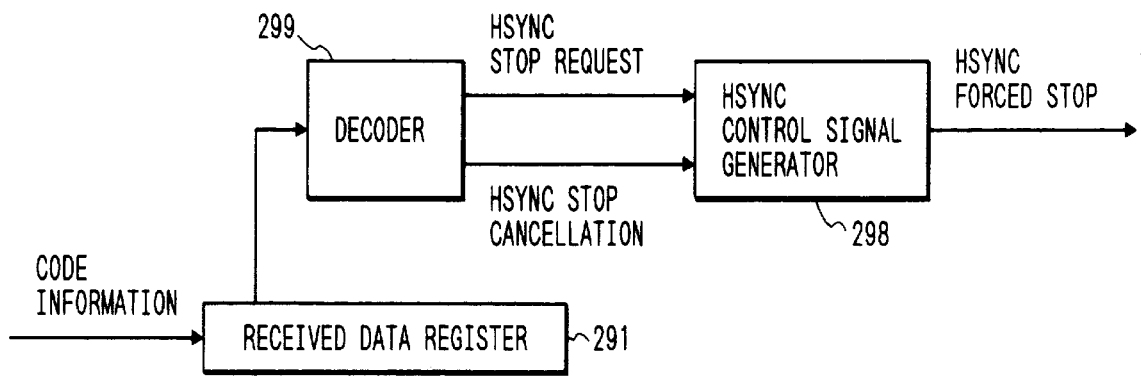
FIG. 18 is a block diagram showing a state in which the data received by the FLCD is processed in the second embodiment.
Figure 19:
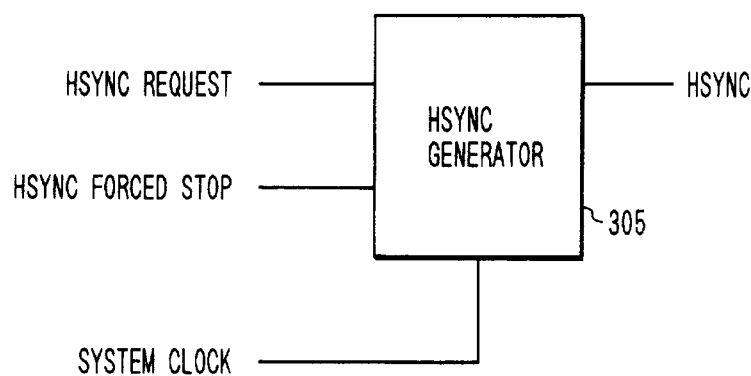
FIG. 19 is a block diagram showing an example of an HSYNC producing circuit in the second embodiment.
Figure 20:
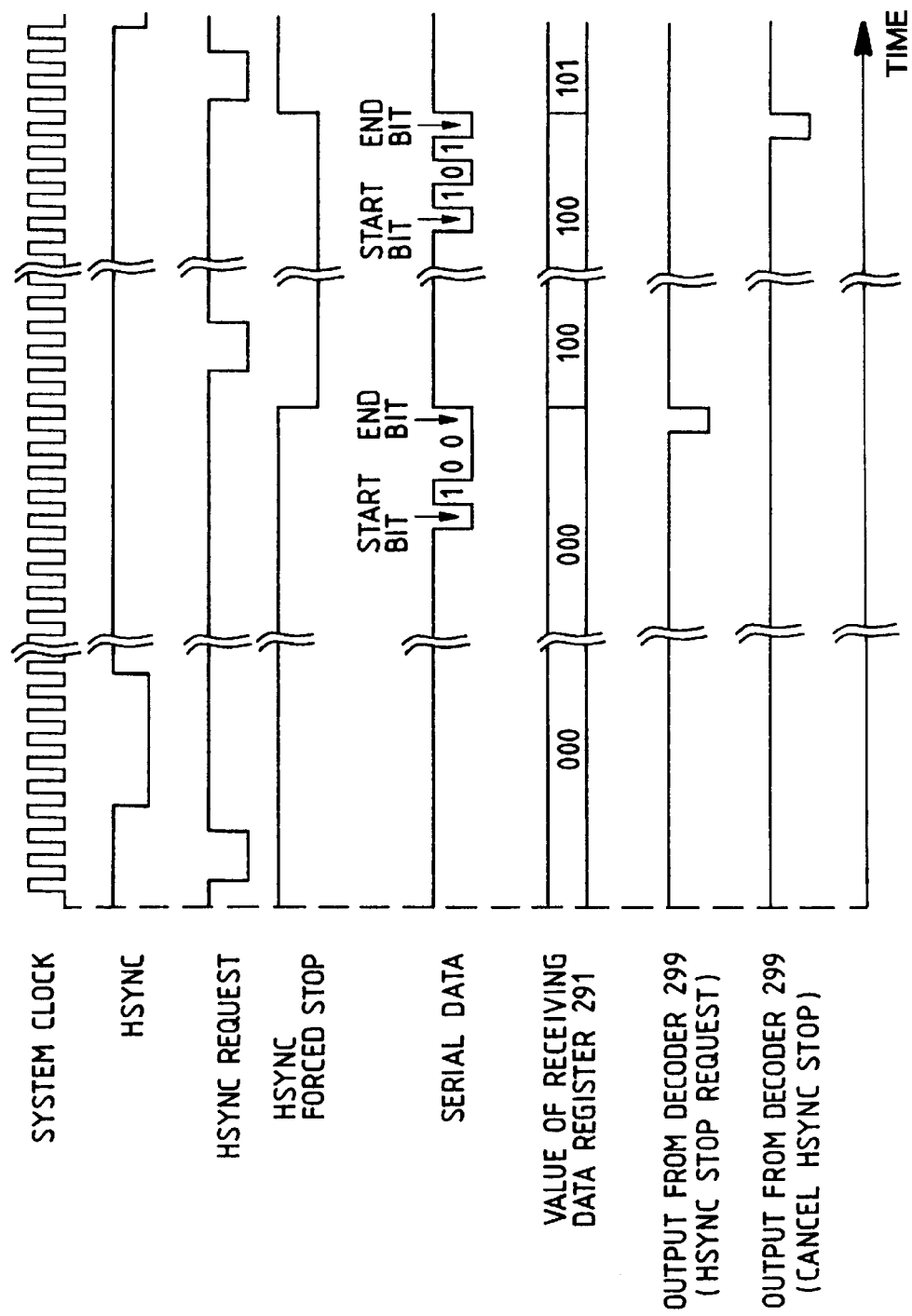
FIG. 20 is a timing chart showing the operation of the HSYNC producing circuit in the second embodiment.

FIG. 18 shows an example of a block diagram in the CPU 29 for receiving the code information which is sent from the CPU 23 in the FLCD interface 19. FIG. 19 shows an example of a block diagram of the HSYNC producing circuit 30. FIG. 20 shows a timing chart for the operations of those blocks.

First, when the CPU 23 in the FLCD interface 19 detects that the effective display region was changed, the code information "100" indicative of the HSYNC stop request is set to the serial data. A start bit and a stop bit are added before and after the serial data. The resultant data is transmitted to the CPU 29 in the FLCD 20. After that, the CPU 23 measures a time enough to change the contents in the VRAM 22 to the contents corresponding to the changed effective display region. After that, the code information "101" indicative of the HSYNC stop cancellation is transmitted as serial data to the CPU 29 in the FLCD 20.

The CPU 29 stores the supplied code information into the receiving data register 291. The code information is decoded by a decoder 299, thereby judging whether it is the code information of the HSYNC stop request or the code information of the HSYNC stop cancellation. Further, when the code information sent from the CPU 23 in the FLCD interface 19 is equal to "100", a signal indicative of the HSYNC stop request in the case where the code information sent from the CPU 23 in the FLCD interface 19 indicates "100" or a signal indicative of the HSYNC stop cancellation in the case where the code information indicates "101" is outputted as a low level signal to the HSYNC control signal generator 298 at the same timing as that of the transmission of a stop bit for only a period of time corresponding to one period of the system clock. When it is detected that the HSYNC stop request signal is at the low level, the HSYNC control signal generator 298 sets the HSYNC control stop signal to the low level. When it is detected that the HSYNC stop cancellation signal is at the low level, the HSYNC control stop signal is set to the high level. For a period of time during which the HSYNC forced stop signal is at the low level, the HSYNC generator 305 in the HSYNC producing circuit 30 doesn't generate the HSYNC signal even if the HSYNC request signal is received.

As mentioned above, the CPU 23 in the FLCD interface 19 detects that the change in effective display region from the total pixel number information and total line number information supplied from the host CPU 1. The CPU 23 transmits only the information indicating whether the HSYNC signal is stopped or not as code information to the CPU 29 in the FLCD 20. Thus, the number of bits to be transmitted is reduced, the transmission speed is improved, and further the circuit is simplified. A timer or counter which the CPU 23 in the FLCD interface 19 has can be used to measure the time enough to rewrite the contents in the VRAM 22 to the contents corresponding to the changed effective display region, so that there is no need to provide the counter in the outside and the circuit is simplified.

Third Embodiment

The second embodiment has been described above with respect to the system such that the CPU 23 in the FLCD interface 19 judges the change of the display region from the total pixel number information and the total line number information which is sent from the host CPU 1 and the command to request the stop of the output of the HSYNC signal is transmitted to the CPU 29 in the FLCD 20. In the third embodiment, explanation will now be made with respect to a system such that the CPU 23 in the FLCD interface 19 detects the change in effective display region from the total pixel number information and the total line number information which are sent from the host CPU 1, so that the HSYNC forced stop signal to request the stop of the HSYNC signal is transmitted to the FLCD 20 via one exclusive-use line.

Figure 21:
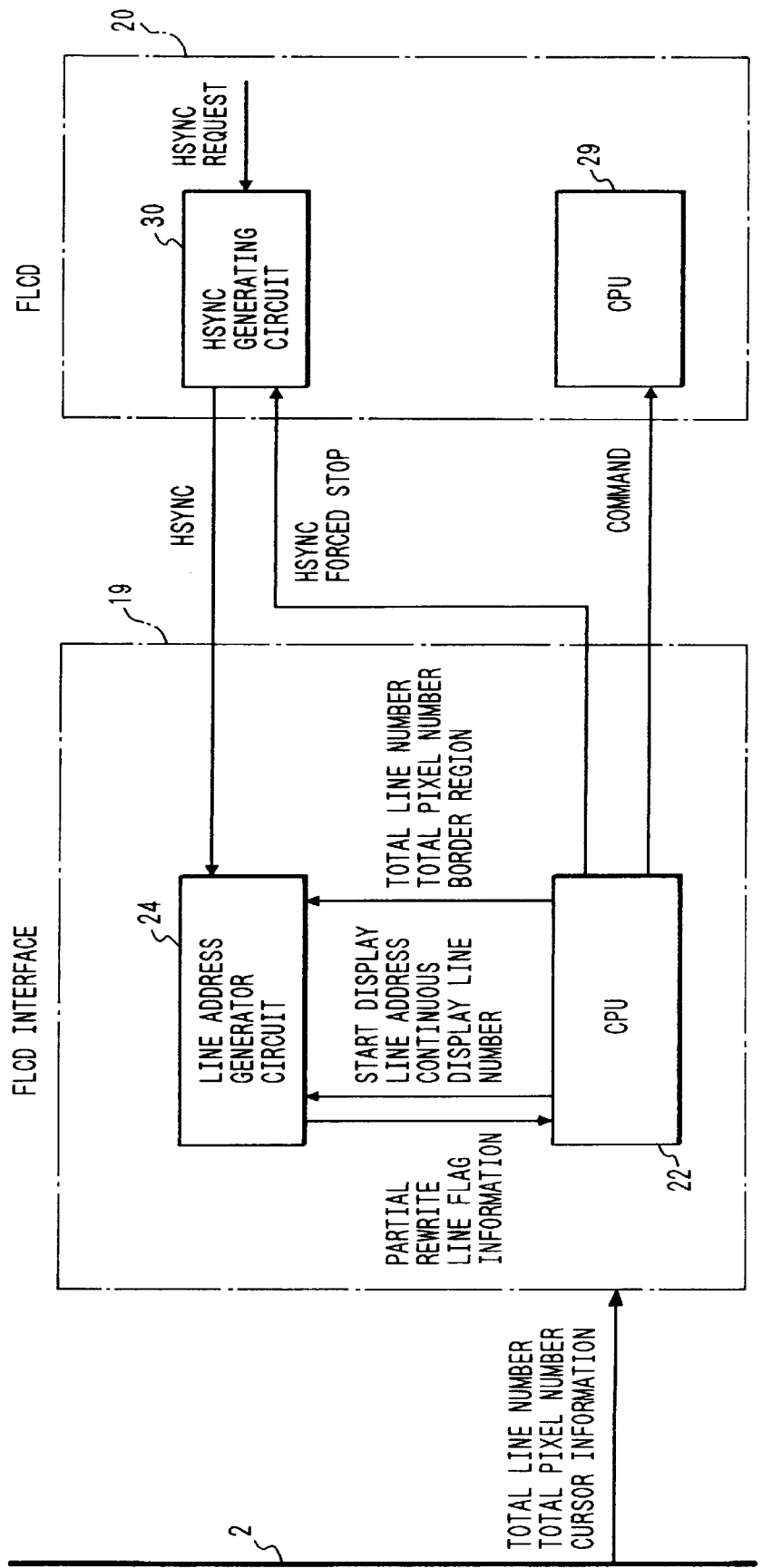
FIG. 21 is a block diagram showing a state in which an HSYNC forced stop signal is transmitted between the FLCD interface and the FLCD in the third embodiment.
Figure 22:
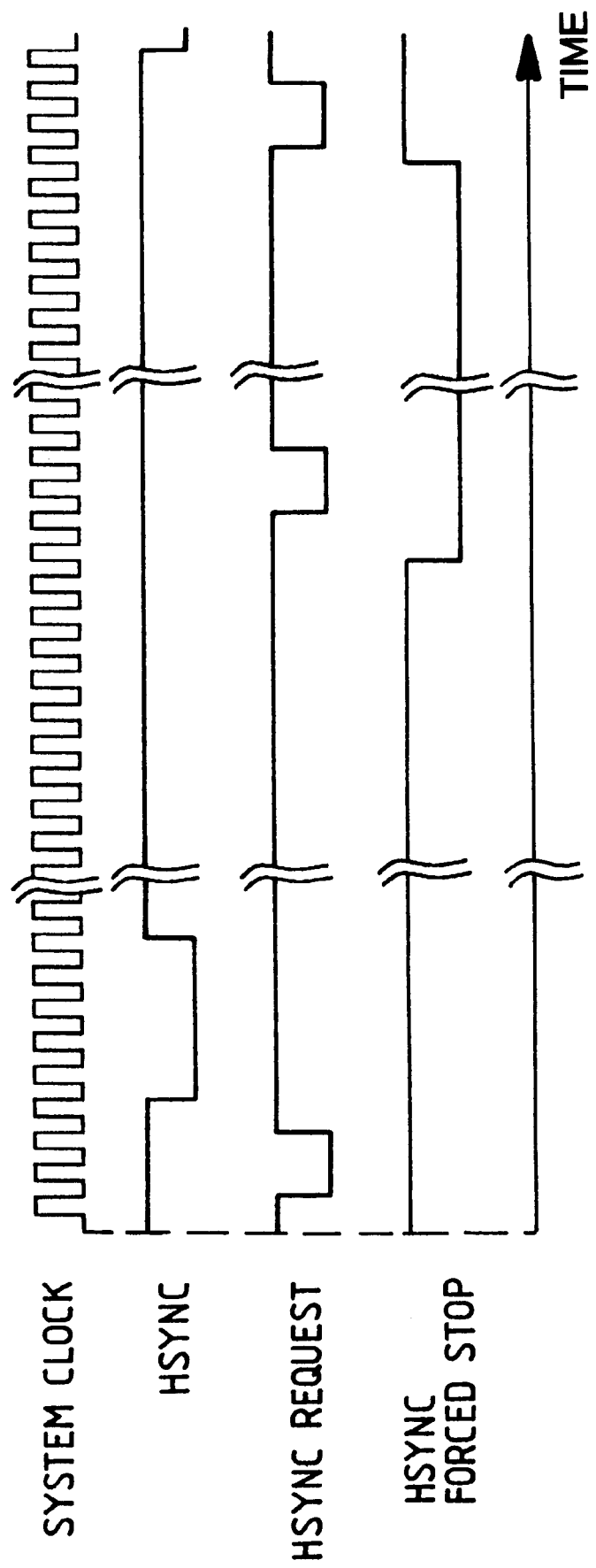
FIG. 22 is a timing chart showing the operation of an HSYNC producing circuit in the third embodiment.

FIG. 21 shows a block diagram showing a state in which the HSYNC forced stop signal is connected by the FLCD interface 19 and the FLCD 20. FIG. 22 shows a timing chart according to the third embodiment. First, when the CPU 23 in the FLCD interface 19 detects that the effective display region was changed, the CPU 23 sets the HSYNC forced stop signal to the low level. After that, the CPU 23 in the FLCD interface 19 measures the time enough to update the contents in the VRAM 22 to the contents corresponding to the changed effective display region and subsequently sets the HSYNC forced stop signal to the high level. The HSYNC forced stop signal is inputted as it is to the HSYNC producing circuit 30 in the FLCD 20. The HSYNC producing circuit 30 is controlled so that the HSYNC generator 305 doesn't generate the HSYNC signal even if the HSYNC request signal is inputted for a period of time during which the HSYNC forced stop signal is at the low level as shown in FIG. 19.

As mentioned above, the CPU 23 in the FLCD interface 19 detects the change in effective display region from the total pixel number information and total line number information which are sent from the host CPU 1 and the information regarding whether the HSYNC signal is stopped or not is transmitted to the FLCD 20 via the exclusive-use line, thereby simplifying the circuit. On the other hand, the timer or counter which the CPU 23 in the FLCD interface 19 has can be used to measure the time enough to rewrite the contents in the VRAM 22 to the contents corresponding to the changed effective display region. Therefore, there is no need to provide a counter in the outside and the circuit is simplified.

Fourth Embodiment

The first and second embodiments have been described with respect to the system such that the change in effective display region is transmitted from the FLCD interface 19 to the FLCD 20 via the transmitting means. The third embodiment has been described with respect to the system such that the change in effective display region is transmitted from the FLCD interface 19 to the FLCD 20 via the exclusive-use line. In the fourth embodiment, explanation will now be made with respect to a system such that the information of the effective display region is transmitted from the FLCD interface 19 to the FLCD 20 by using the nonused bits of the information which are sent through the signal line to transmit the display line address and pixel data, the change in effective display region is detected in the FLCD 20, and the output of the HSYNC signal is stopped.

Figure 23:
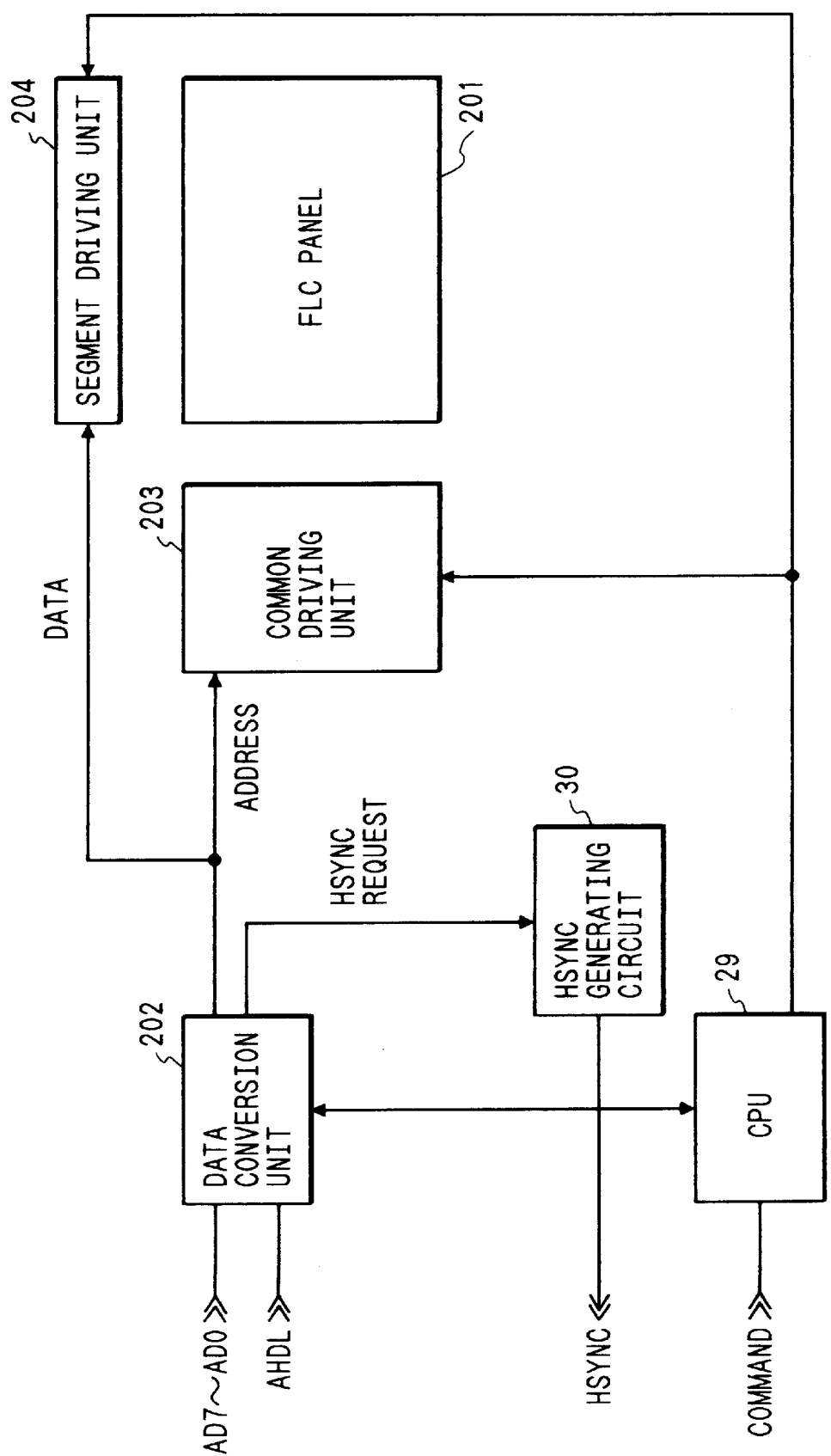
FIG. 23 is a block diagram showing a constructional example of the FLCD.

FIG. 23 shows a constructional example of the FLCD 20. Reference numeral 201 denotes an FLC panel. For example, like a panel disclosed in Japanese Patent Application Laid-Open No. 63-243919, the FLC panel 201 comprises: a pair of upper and lower glass substrates with polarizers in which an FLC is sealed between them; a group of transparent electrode wirings provided on the upper and lower glass substrates; and the like. The wiring direction of the group of wires on the upper glass substrate is perpendicular to the wiring direction of the group of wires on the lower glass substrate. The number of wires can be properly decided in accordance with a size of display image frame and a resolution. In the embodiment, 7680 (=1280 pixels×two bits for each of the colors R, G, and B) wires are provided in the horizontal direction and 1024 wires are provided in the vertical scan line direction. In accordance with a polarity and intensity of an electrode of an electric field which is developed in an intersecting portion of the wires, an orientation state of the FLCD in such a portion can be changed. Therefore, the number of display pixels of the FLC panel in the embodiment is equal to 1280×1024.

In the embodiment, the group of 1024 wires existing in the horizontal scanning direction are referred to as common side wires and the foregoing sequential line addresses are allocated to them. The group of 7680 wires existing in the vertical scanning direction are referred to as segment side wires. When a certain common side wire (line) is selected and driven, by driving the segment side wire, the display, erasure, and updating of the relevant line are executed.

In FIG. 23, reference numerals 203 and 204 denote driving units (common driving unit, segment driving unit) to drive the common side wires and segment side wires, respectively. The driving units 203 and 204 drive each wire by a voltage signal of a proper waveform in accordance with the display data. A waveform and the like in this instance have been disclosed in, for example, Japanese Patent Application Laid-Open No. 63-243919.

Display data signals relate to display lines and are inputted from the FLCD interface 19 as signals AD0 to AD7 having a width of eight bits comprising the portion indicative of the line address and the subsequent data group (data of 7680 dots). To discriminate the address portion of the relevant signal and the data group, an ID signal AHDL which is set to the high level in the address portion and is set to the low level in the data group portion is supplied from the FLCD interface 19. A data conversion unit 202 separates the line addresses and the data group from the display data signals AD0 to AD7 on the basis of the ID signal AHDL and set into the common driving unit 203 and segment driving unit 204, respectively.

When the line addresses and the data group inputted to the data conversion unit 202 are set into the common driving unit 203 and segment driving unit 204, respectively, the data conversion unit 202 generates an HSYNC request signal indicating an output request of the HSYNC signal in order to request the next display data to the HSYNC producing circuit 30.

Further, as described above, the CPU 29 executes a control of the FLCD 20 such that the common driving unit 203 and segment driving unit 204 are controlled and the circuit is initialized and the like in accordance with various command information which is sent from the FLCD interface 19 through the transmitting means.

Figure 24:
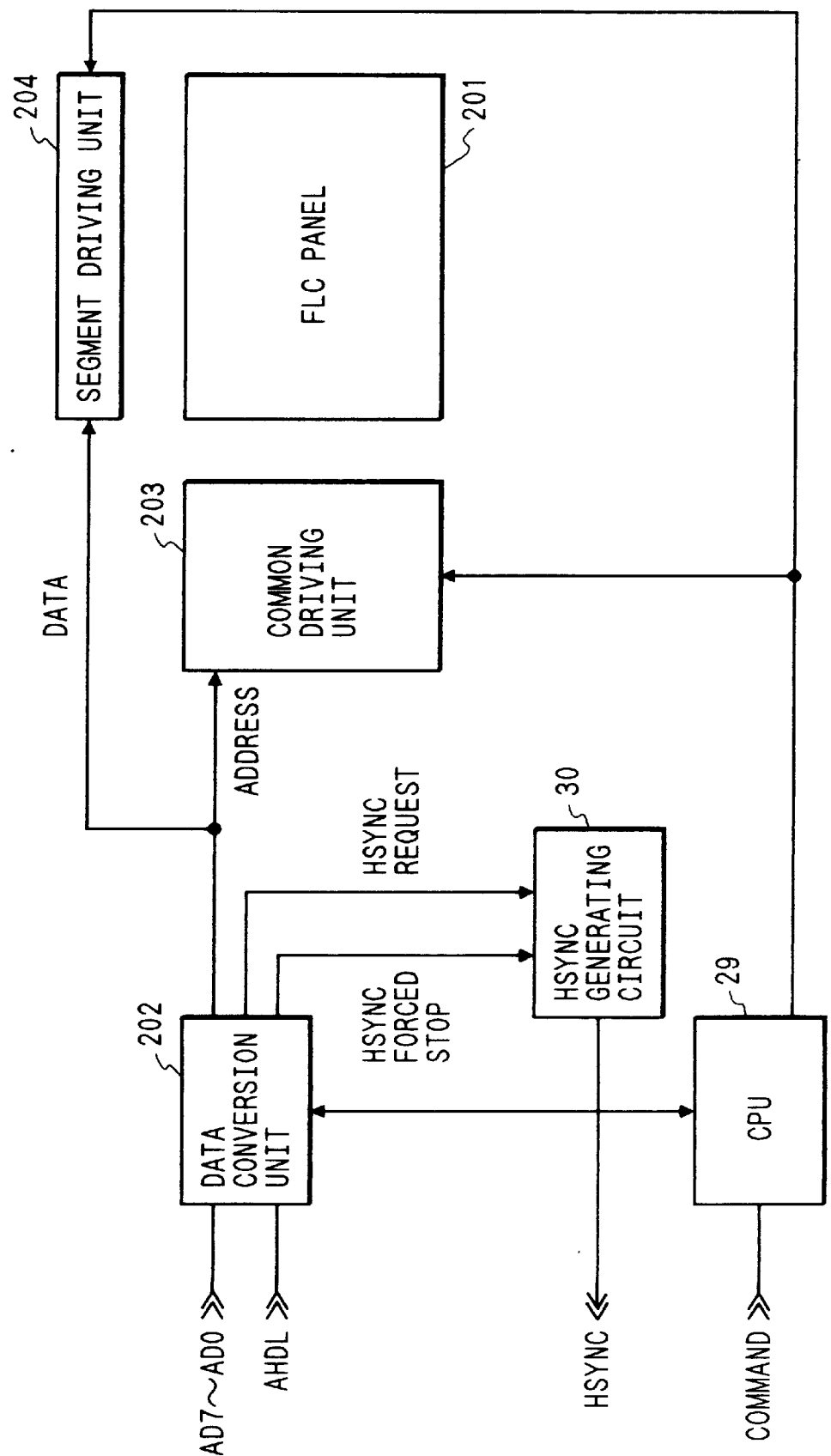
FIG. 24 is a block diagram showing a constructional example of the FLCD in the fourth embodiment.
Figure 25:
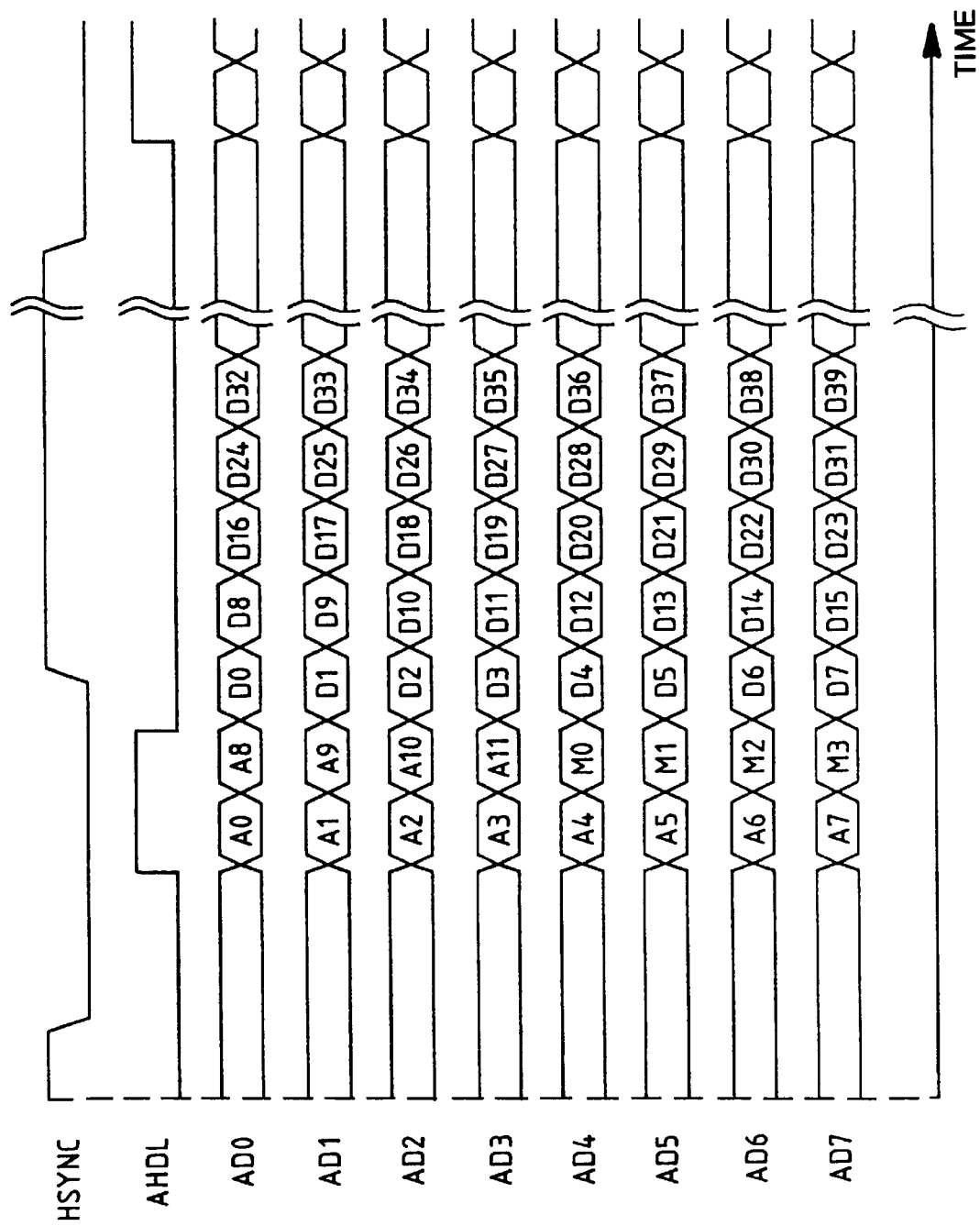
FIG. 25 is a timing chart showing a state in which line addresses and pixel data are transmitted to the FLCD in the fourth embodiment.
Figure 26:
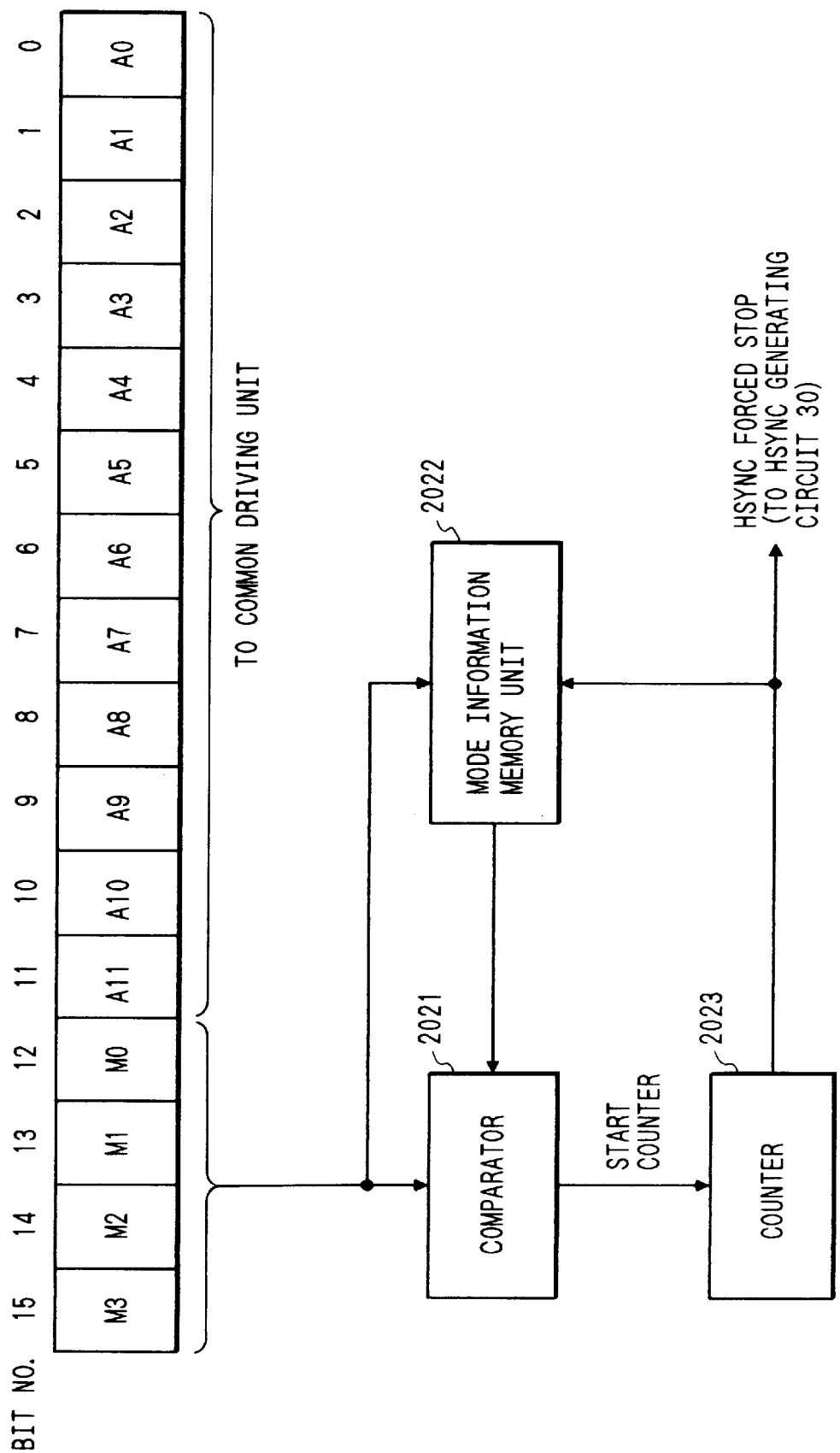
FIG. 26 is a block diagram showing an example of a data conversion unit in the fourth embodiment.

FIG. 24 shows a constructional example of the FLCD 20 in the embodiment. FIG. 25 shows a state in which the display line addresses and pixel data are transmitted from the FLCD interface 19 to the FLCD 20 in the embodiment. FIG. 26 is a schematic diagram showing a state in which the line address information is processed by the data conversion unit 202 in the embodiment.

In the first embodiment, it is assumed that the display line addresses are set to 12 bits of A0 to A11 and up to 4096 lines can be expressed as shown in FIG. 9. The first embodiment has been shown and described with respect to the example in which the bits A0 to A7 are transmitted onto the display data signal lines AD0 to AD7 with the width of eight bits by the first transmission and, in the second transmission, the bits A8 to A11 are transmitted and "0" is also transmitted as remaining four bits as nonused bits.

In the embodiment, as shown in FIG. 25, four bits as nonused bits are set to M0 to M3 and are used as effective display region information.

Sixteen kinds of information can be expressed by a combination of four bits of M0 to M3. It is assumed that each combination of four bits is made correspond to the effective display region information as follows.

| M3 | M2 | M1 | M0 | | | |
|----|----|----|----|----|----|----|
| 0 | 0 | 0 | 0 | ... | 320 pixels × 200 lines | 16 colors |
| 0 | 0 | 0 | 1 | ... | 640 pixels × 400 lines | 16 colors |
| 0 | 0 | 1 | 0 | ... | 640 pixels × 480 lines | 16 colors |
| 0 | 0 | 1 | 1 | ... | 1280 pixels × 1024 lines | 16 colors |
| . | | | | | . | |
| . | | | | | . | |

As shown in FIG. 26, the data conversion unit 202 in the FLCD 20 rearranges the line address information sent from the FLCD interface 19 through the display data signal lines AD0 to AD7 of the width of eight bits to a data train of 16 bits and provides the lower 12 bits (A0 to A11) among them as line addresses to the common driving unit 203. The remaining upper four bits (M0 to M3) are inputted to a comparator 2021. The comparator 2021 compares the values from M0 to M3 and a value stored in a mode information memory unit 2022. When they differ, the comparator 2021 outputs a signal to start a counter 2023 at the post stage to the counter 2023. An up counter of eight bits is used as a counter 2023 here. The counter 2023 starts the count-up operation from "1" on the basis of the counter start signal which is outputted from the comparator 2021. The counter 2023 executes the count-up operation until the count value is equal to "FF" as a hexadecimal number. The count value is returned to "0" at a time point when the count value is equal to "FF" and the count-up operation is stopped. It is necessary to set the number of bits of the counter to a value such as to obtain the time enough to rewrite the contents in the VRAM 22 to the contents corresponding to the changed effective display region when the effective display region is changed. The number of bits can be set to an arbitrary value so long as it is equal to or larger than such a value. As a value to be counted, a predetermined value can be set in the counter 2023. Or, for example, it can be also freely set by external means such as a CPU 29.

The counter 2023 outputs the HSYNC forced stop signal as a signal to stop the output of the HSYNC signal to the HSYNC producing circuit 30 during the count-up operation. As shown in FIG. 19 of the second embodiment, the HSYNC producing circuit 30 is controlled so that the HSYNC generator 305 doesn't generate the HSYNC signal even if the HSYNC request signal is inputted for a period of time during which the HSYNC forced stop signal is at the low level.

Further, the HSYNC forced stop signal is also inputted to the mode information memory unit 2022 and four bits of M0 to M3 are stored into the mode information memory unit 2022 at a moment when the HSYNC forced stop signal changes from the low level to the high level, namely, at a time point when the stop of the output of the HSYNC signal is cancelled.

A state of the operation of the FLCD 20 in the embodiment as described above is shown in a timing chart of FIG. 27.

The embodiment has been described with respect to the system such that the effective display region information is transmitted from the FLCD interface 19 to the FLCD 20 by using four nonused bits of the line address information. However, it is also possible to use a system such that the change in effective display region is judged in the FLCD interface 19 and the change in effective display region is transmitted from the FLCD interface 19 to the FLCD 20 by using only one bit among the four nonused bits.

According to the embodiment, when the effective display region is switched, the output of the HSYNC signal can be stopped and a disturbance of the display image frame can be prevented without intervening the CPU in order to detect that the effective display region was changed as shown in the first and second embodiments or without providing the exclusive-use signal line to indicate whether the HSYNC signal is stopped or not as shown in the third embodiment.

Fifth Embodiment

The first to fourth embodiments have been described with respect to the system such that the change in effective display region is detected by the FLCD interface 19 or FLCD 20 and the HSYNC signal to request the output of the display data is stopped. In the fifth embodiment, explanation will now be made with respect to a system such that in the case where the change in effective display region is detected, even if the HSYNC signal is outputted, the display data is not outputted until the contents in the VRAM are rewritten to the contents corresponding to the changed effective display region.

In FIG. 2 showing the constructional example of the FLCD interface 19, in the case where the display line addresses and the number of continuous display lines are not set from the CPU 23 into the line address producing circuit 24, even if the HSYNC signal is outputted from the FLCD 20, no display data is outputted to the FLCD 20.

Therefore, the CPU 23 judges the change in effective display region from the total pixel number information and total line number information which are sent from the host CPU 1. The display line addresses and the number of continuous display lines are not set into the line address producing circuit 24 until the contents in the VRAM 22 are rewritten to the contents corresponding to the changed effective display region. Thus, even if the HSYNC signal is outputted from the FLCD 20, there is no need to display the information in the VRAM 22 during the operation to rewrite the contents in the VRAM 22 to the contents corresponding to the changed effective display region. Such a state is shown in a timing chart of FIG. 28.

Further, by transmitting the change in effective display region from the FLCD interface 19 to the FLCD 20 by using either one of the systems of the first to fourth embodiments, the change in effective display region is detected in the FLCD 20. The HSYNC signal is outputted at the low level for a period of time enough to rewrite the contents in the VRAM 22 to the contents corresponding to the changed effective display region. When the display data corresponding to the changed effective display region is sent from the FLCD interface 19, the operation in the FLCD 20 is recovered. Thus, the FLCD 20 is not left in the standby state in vain. Further, there is no need to display the contents in the VRAM 22 in the step of updating to the contents corresponding to the changed effective display region. The disturbance of the image frame can be prevented.

According to the embodiments as described above, by providing the means for detecting that the effective display region was changed on the FLCD interface side or the FLCD side when the effective display region to display is changed during a process of using the FLCD as display means, the signal to request the transmission of the display information can be stopped until the contents in the VRAM in which the information to be displayed has been stored are updated to the information after the effective display region was changed. There is no need to display the contents in the VRAM during the step of updating to the information after completion of the change of the effective display region without waiting for the process of the FLCD. Therefore, a disturbed image is not displayed when the effective display region is changed. A display image of a high quality can be obtained.

What is claimed is:

1. A display system for displaying an image in one or more display formats, each having a respective resolution of effective display regions, said display system comprising:
   a display having a circuit for generating and transmitting a horizontal synchronizing signal;
   a display controller for receiving the horizontal synchronizing signal transmitted from said circuit, and for outputting to said display image data synchronized with the horizontal synchronizing signal, said display controller having a memory for storing the image data; and
   means, responsive to a change in the display format of received image data, for precluding the transmission of the horizontal synchronizing signal to said display controller during a predetermined period determined by the horizontal synchronizing signal, said predetermined period being longer than a period for transferring image data of one horizonal scanning line.

2. A system according to claim 1, wherein said means has detection means for detecting the change in the display format.

3. A system according to claim 2, wherein said detection means is provided at said display.

4. A system according to claim 2, wherein said detection means is provided at said display controller.

5. A system according to claim 1, wherein the horizontal synchronizing signal normally comprises a pulse having binary levels, but during the predetermined period comprises a pulse signal of only a single level transmitted to said display controller.

6. A system according to claim 1, wherein said display has a display panel having a memory function.

7. A system according to claim 6, wherein said display panel is a ferroelectric liquid crystal display panel.

8. A display apparatus for displaying an image in one or more display formats, each having a respective resolution of effective display regions, said display apparatus comprising:

a display controller for generating image data and having a memory function of storing the image data;

a circuit for generating and transmitting a horizontal synchronizing signal to be transmitted to the display controller;

means, responsive to a change in the display format of received image data, for stopping the transmission of the horizontal synchronizing signal during a predetermined period determined by the horizontal synchronizing signal, said predetermined period being longer than a period of transferring the image data of one horizontal scanning line.

9. A display apparatus for displaying an image in one or more display formats, each having a respective resolution of effective display regions, said display apparatus comprising:

a circuit for generating and transmitting a horizontal synchronizing signal to be transmitted to a display controller which generates image data and has a memory for storing the image data;

means, responsive to a change in the display format of received image data, for stopping the transmission of the horizontal synchronizing signal to said display controller during a predetermined period determined by the horizontal synchronizing signal, said predetermined period being sufficiently long such that said memory completes storing the image data of the display format after the change.

10. A display system for displaying an image in one or more display formats, each having a respective resolution of effective display regions, said display system comprising:

a display having a circuit for generating and transmitting a horizontal synchronizing signal;

a display controller for receiving the horizontal synchronizing signal transmitted from said circuit, and for outputting to said display image data synchronized with the horizontal synchronizing signal, said display controller having a memory for storing the image data; and means, responsive to a change in the display format of received image data, for precluding the transmission of the horizontal synchronizing signal to said display controller during a predetermined period determined by the horizontal synchronizing signal, said predetermined period being sufficiently long such that said memory completes storing the image data of the display format after the change.

11. A system according to claim 10, wherein said means has detection means for detecting the change in the display format.

12. A system according to claim 11, wherein said detection means is provided at said display.

13. A system according to claim 11, wherein said detection means is provided at said display controller.

14. A system according to claim 10, wherein the horizontal synchronizing signal normally comprises a pulse having binary levels, but during the predetermined period comprises a pulse signal of only a single level transmitted to said display controller.

15. A system according to claim 10, wherein said display has a display panel having a memory function.

16. A system according to claim 15, wherein said display panel is a ferroelectric liquid crystal display panel.

* * * * *

UNITED STATES PATENT AND TRADEMARK OFFICE
CERTIFICATE OF CORRECTION

PATENT NO. : 6,140,992
DATED : October 31, 2000
INVENTOR(S) : Eiichi Matsuzaki et al.

It is certified that error appears in the above-identified patent and that said Letters Patent is hereby corrected as shown below:

Title page,
Item [56], References Cited, U.S. PATENT DOCUMENTS,
"3/1995 Hughues" should read -- 3/1995 Hughes --.

Drawings,
Sheet 8 of 26, Figure 8, "BIT'S" (3 occurrences) should read -- BITS --; and
Sheet 12 of 26, Figure 12, "NUMBR" should read -- NUMBER --.

Column 5,
Line 19, "operation the" should read -- operation of the --.

Column 6,
Line 60, "7 B." should read -- 7B. --

Column 12,
Line 6, "supplied" should read -- is supplied --.

Column 14,
Line 26, "made correspond" should read -- made to correspond --.

Signed and Sealed this

Fifth Day of February, 2002

Attest:

JAMES E. ROGAN
*Attesting Officer*   *Director of the United States Patent and Trademark Office*